(12) United States Patent
Lango et al.

(10) Patent No.: US 9,152,600 B2
(45) Date of Patent: *Oct. 6, 2015

(54) SYSTEM AND METHOD FOR CACHING NETWORK FILE SYSTEMS

(71) Applicant: NetApp, Inc., Sunnyvale, CA (US)

(72) Inventors: Jason Ansel Lango, Mountain View, CA (US); Robert M. English, Menlo Park, CA (US); Paul Christopher Eastham, Mountain View, CA (US); Qinghua Zheng, San Jose, CA (US); Brian Mederic Quirion, San Jose, CA (US); Peter Griess, San Francisco, CA (US); Matthew Benjamin Amdur, San Francisco, CA (US); Kartik Ayyar, Sunnyvale, CA (US); Robert Lieh-Yuan Tsai, Boston, MA (US); David Grunwald, Santa Clara, CA (US); J. Chris Wagner, Langley, WA (US); Emmanuel Ackaouy, Cambridge (GB); Ashish Prakash, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 55 days.
This patent is subject to a terminal disclaimer.

(21) Appl. No.: 13/945,637

(22) Filed: Jul. 18, 2013

(65) Prior Publication Data

US 2013/0304844 A1 Nov. 14, 2013

Related U.S. Application Data

(63) Continuation of application No. 13/206,705, filed on Aug. 10, 2011, now Pat. No. 8,626,866, which is a continuation of application No. 11/409,625, filed on Apr. 24, 2006, now Pat. No. 8,055,702.

(60) Provisional application No. 60/674,609, filed on Apr. 25, 2005.

(51) Int. Cl.
*G06F 15/167* (2006.01)
*G06F 3/06* (2006.01)
*H04L 29/08* (2006.01)

(52) U.S. Cl.
CPC .................... *G06F 15/167* (2013.01);
(Continued)

(58) Field of Classification Search
CPC ............ H04L 67/2842; H04L 67/2823; H04L 67/2847; H04L 29/08846; G06F 15/167; G06F 3/0601
USPC .......... 709/203, 204, 214, 216, 217; 711/118, 711/119, 120
See application file for complete search history.

(56) References Cited

U.S. PATENT DOCUMENTS

| 4,156,907 A | 5/1979 | Rawlings et al. |
|---|---|---|
| 4,399,503 A | 8/1983 | Hawley |

(Continued)

FOREIGN PATENT DOCUMENTS

| EP | 1349089 A2 | 1/2003 |
|---|---|---|
| WO | WO 89/10594 | 11/1989 |

(Continued)

OTHER PUBLICATIONS

Azagury et al. "Point-in-Time Copy: Yesterday, Today and Tomorrow", IBM, 2002, 12 pages.

(Continued)

*Primary Examiner* — Thu Ha Nguyen
(74) *Attorney, Agent, or Firm* — Cesari and McKenna, LLP

(57) ABSTRACT

A network caching system has a multi-protocol caching filer coupled to an origin server to provide storage virtualization of data served by the filer in response to data access requests issued by multi-protocol clients over a computer network. The multi-protocol caching filer includes a file system configured to manage a sparse volume that "virtualizes" a storage space of the data to thereby provide a cache function that enables access to data by the multi-protocol clients. To that end, the caching filer further includes a multi-protocol engine configured to translate the multi-protocol client data access requests into generic file system primitive operations executable by both the caching filer and the origin server.

19 Claims, 11 Drawing Sheets

(52) U.S. Cl.
CPC ......... *H04L 67/2842* (2013.01); *G06F 3/0601* (2013.01); *G06F 2003/0697* (2013.01); *H04L 29/08846* (2013.01); *H04L 67/2823* (2013.01)

(56) References Cited

U.S. PATENT DOCUMENTS

| | | | |
|---|---|---|---|
| 4,408,273 A | 10/1983 | Plow | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,426,747 A | 6/1995 | Weinreb et al. | |
| 5,485,579 A | 1/1996 | Hitz et al. | |
| 5,519,844 A | 5/1996 | Stallmo et al. | |
| 5,535,381 A | 7/1996 | Kopper | |
| 5,568,455 A | 10/1996 | Balsom | |
| 5,581,724 A | 12/1996 | Belsan et al. | |
| 5,737,747 A | 4/1998 | Vishlitzky et al. | |
| 5,802,366 A | 9/1998 | Row et al. | |
| 5,819,292 A | 10/1998 | Hitz et al. | |
| 5,829,046 A | 10/1998 | Tzelnic et al. | |
| 5,918,229 A | 6/1999 | Davis et al. | |
| 5,931,918 A | 8/1999 | Row et al. | |
| 5,933,603 A | 8/1999 | Vahalia et al. | |
| 5,940,838 A | 8/1999 | Schmuck et al. | |
| 5,941,972 A | 8/1999 | Hoese et al. | |
| 5,963,962 A | 10/1999 | Hitz et al. | |
| 5,974,544 A | 10/1999 | Jeffries et al. | |
| 5,978,792 A | 11/1999 | Bhargava et al. | |
| 5,991,810 A * | 11/1999 | Shapiro et al. | 709/229 |
| 6,029,175 A * | 2/2000 | Chow et al. | |
| 6,038,570 A | 3/2000 | Hitz et al. | |
| 6,065,037 A | 5/2000 | Hitz et al. | |
| 6,138,162 A * | 10/2000 | Pistriotto et al. | 709/229 |
| 6,170,013 B1 * | 1/2001 | Murata | 709/229 |
| 6,229,806 B1 | 5/2001 | Lockhart et al. | |
| 6,269,431 B1 | 7/2001 | Dunham | |
| 6,360,330 B1 | 3/2002 | Mutalik et al. | |
| 6,425,035 B2 | 7/2002 | Hoese et al. | |
| 6,493,718 B1 | 12/2002 | Petculescu et al. | |
| 6,513,051 B1 | 1/2003 | Bolosky et al. | |
| 6,571,259 B1 | 5/2003 | Zheng et al. | |
| 6,574,618 B2 | 6/2003 | Eylon et al. | |
| 6,598,121 B2 * | 7/2003 | Challenger et al. | 711/122 |
| 6,629,138 B1 | 9/2003 | Lambert et al. | |
| 6,636,879 B1 | 10/2003 | Doucette et al. | |
| 6,643,654 B1 | 11/2003 | Patel et al. | |
| 6,735,601 B1 | 5/2004 | Subrahmanyam | |
| 6,769,019 B2 * | 7/2004 | Ferguson | 709/219 |
| 6,772,161 B2 | 8/2004 | Mahalingam et al. | |
| 6,804,690 B1 | 10/2004 | Dysert et al. | |
| 6,813,633 B2 * | 11/2004 | Wong et al. | 709/217 |
| 6,895,413 B2 | 5/2005 | Edwards | |
| 7,035,846 B2 * | 4/2006 | Gupta et al. | |
| 7,043,503 B2 | 5/2006 | Haskin et al. | |
| 7,107,385 B2 | 9/2006 | Rajan et al. | |
| 7,171,465 B1 | 1/2007 | Endo et al. | |
| 7,171,469 B2 | 1/2007 | Ackaouy et al. | |
| 7,191,290 B1 | 3/2007 | Ackaouy et al. | |
| 7,194,579 B2 | 3/2007 | Robinson et al. | |
| 7,197,490 B1 | 3/2007 | English | |
| 7,296,068 B1 | 11/2007 | Sarma et al. | |
| 7,337,214 B2 * | 2/2008 | Douglass et al. | 709/214 |
| 7,426,617 B2 | 9/2008 | Stager et al. | |
| 7,430,571 B2 | 9/2008 | Edwards et al. | |
| 7,447,937 B2 | 11/2008 | Grubbs et al. | |
| 7,565,423 B1 * | 7/2009 | Fredricksen | 709/223 |
| 7,631,078 B2 | 12/2009 | Ackaouy et al. | |
| 7,664,916 B2 * | 2/2010 | Griffin et al. | 711/115 |
| 7,689,609 B2 | 3/2010 | Lango et al. | |
| 8,150,985 B2 * | 4/2012 | Nakamura | 709/229 |
| 8,224,964 B1 * | 7/2012 | Fredrickson et al. | 709/227 |
| 8,271,677 B2 * | 9/2012 | Gordon et al. | 709/231 |
| 8,812,651 B1 * | 8/2014 | Eriksen et al. | 709/224 |
| 2002/0035672 A1 | 3/2002 | Challenger et al. | |
| 2002/0083037 A1 | 6/2002 | Lewis et al. | |
| 2002/0112022 A1 | 8/2002 | Kazar et al. | |
| 2002/0133537 A1 | 9/2002 | Lau et al. | |
| 2002/0178232 A1 * | 11/2002 | Ferguson | 709/217 |
| 2002/0194484 A1 | 12/2002 | Bolosky et al. | |
| 2003/0018878 A1 | 1/2003 | Dorward et al. | |
| 2003/0105857 A1 * | 6/2003 | Kamen et al. | 709/224 |
| 2003/0115434 A1 | 6/2003 | Mahalingam et al. | |
| 2003/0126107 A1 | 7/2003 | Yamagami et al. | |
| 2003/0158863 A1 | 8/2003 | Haskin et al. | |
| 2003/0158873 A1 | 8/2003 | Sawdon et al. | |
| 2003/0182253 A1 | 9/2003 | Chen et al. | |
| 2003/0182301 A1 | 9/2003 | Patterson et al. | |
| 2003/0182389 A1 | 9/2003 | Edwards | |
| 2003/0191858 A1 * | 10/2003 | Adusumilli | 709/246 |
| 2003/0195887 A1 | 10/2003 | Vishlitzky et al. | |
| 2003/0208533 A1 * | 11/2003 | Farquharson et al. | 709/203 |
| 2004/0019615 A1 | 1/2004 | Sutoh et al. | |
| 2004/0030668 A1 | 2/2004 | Pawlowski et al. | |
| 2004/0030822 A1 | 2/2004 | Rajan et al. | |
| 2004/0044744 A1 | 3/2004 | Grosner et al. | |
| 2004/0054748 A1 | 3/2004 | Ackaouy et al. | |
| 2004/0054777 A1 | 3/2004 | Ackaouy et al. | |
| 2004/0117437 A1 | 6/2004 | Frank | |
| 2004/0139161 A1 | 7/2004 | Loh | |
| 2004/0186961 A1 | 9/2004 | Kimura et al. | |
| 2004/0268068 A1 | 12/2004 | Curran et al. | |
| 2005/0008016 A1 | 1/2005 | Shimozono | |
| 2005/0021566 A1 | 1/2005 | Mu | |
| 2005/0033926 A1 * | 2/2005 | Dumont | 711/138 |
| 2005/0038850 A1 | 2/2005 | Oe | |
| 2005/0050110 A1 | 3/2005 | Sawdon et al. | |
| 2005/0114289 A1 | 5/2005 | Fair | |
| 2005/0114672 A1 | 5/2005 | Duncan et al. | |
| 2005/0154825 A1 | 7/2005 | Fair et al. | |
| 2005/0192932 A1 | 9/2005 | Kazar et al. | |
| 2005/0240725 A1 | 10/2005 | Robinson et al. | |
| 2005/0246382 A1 | 11/2005 | Edwards et al. | |
| 2005/0246401 A1 | 11/2005 | Edwards et al. | |
| 2005/0278383 A1 | 12/2005 | Kazar | |
| 2006/0036676 A1 | 2/2006 | Cardone et al. | |
| 2006/0085471 A1 | 4/2006 | Rajan et al. | |
| 2006/0136418 A1 | 6/2006 | Hudis et al. | |
| 2006/0179261 A1 | 8/2006 | Rajan | |
| 2007/0088929 A1 | 4/2007 | Hanai et al. | |
| 2007/0124341 A1 | 5/2007 | Lango et al. | |
| 2007/0156966 A1 * | 7/2007 | Sundarrajan et al. | 711/133 |
| 2007/0244987 A1 * | 10/2007 | Pedersen et al. | 709/217 |
| 2008/0155220 A1 | 6/2008 | Edwards et al. | |
| 2008/0195819 A1 * | 8/2008 | Dumont | 711/138 |
| 2008/0201331 A1 * | 8/2008 | Eriksen et al. | 707/10 |
| 2010/0169392 A1 | 7/2010 | Lev Ran et al. | |
| 2011/0246201 A1 * | 10/2011 | Hawit | 704/260 |
| 2012/0221670 A1 * | 8/2012 | Frydman et al. | 709/213 |
| 2012/0221865 A1 * | 8/2012 | Hahn et al. | 713/193 |
| 2012/0311062 A1 * | 12/2012 | Frydman et al. | 709/212 |

(56) References Cited

U.S. PATENT DOCUMENTS

| | | | |
|---|---|---|---|
| 2013/0268831 A1* | 10/2013 | Ruan et al. | 715/205 |
| 2014/0006357 A1* | 1/2014 | Davis et al. | 707/667 |
| 2014/0006465 A1* | 1/2014 | Davis et al. | 707/827 |
| 2014/0297954 A1* | 10/2014 | Clevenger | 711/118 |

FOREIGN PATENT DOCUMENTS

| | | |
|---|---|---|
| WO | PCT/US2003/02398 | 9/2003 |
| WO | WO 2004/025429 A2 | 3/2004 |
| WO | WO 2004/015521 | 7/2004 |

OTHER PUBLICATIONS

"Notification of Transmittal of the International Search Report and the Written Opinion of the International Searching Authority, or the Declaration", mailed Apr. 24, 2006, International Application No. PCT/US2006/015442, 7 pages.

Cramer et al. "System and Method for Associating a Network Address with a Storage Device", U.S. Appl. No. 10/138,918, filed May 3, 2002, 35 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Fielding et al. (1999) Request for Comments (RFC) 2616, HTTP/1.1, 143 pages.

Black, David L. "Scheduling and Resource Management Techniques for Multiprocessors", Jul. 1009, CMU-CS-90-152.

Lango et al. "System and Method for Sparse Volumes", U.S. Appl. No. 60/674,611, filed Apr. 25, 2005, 52 pages.

Lango, Jason Ansel. "System and Method for Restoring Data on Demand for Instant Volume Restoration", U.S. Appl. No. 60/674,430, filed Apr. 25, 2005, 57 pages.

Akyurek, Sedat, Placing Replicated Data to Reduce Seek Delays, Department of Computer Science, University of Maryland, UMIACS-TR-91-121, CS-TR-2746, Aug. 1991.

Chaudhuri, Surajit, et al., Self-Tuning Technology in Microsoft SQL Server, Data Engineering Journal 22, 2 1999 pp. 20-27.

Coyne, Robert A., et al., Storage Systems for National Information Assets, Proc. Supercomputing 92, Minneapolis, Nov. 1992, pp. 626-633.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Kazar, Michael Leon, Synchronization and Caching Issues in the Andrew File System, Carnegie Mellon University, CMU-ITC-88-063.

Kemper, Alfons, et al., Performance Tuning for SAP R/3, Data Engineering Journal 22, 2 1999 pp. 33-40.

Kent, Jack et al., Optimizing Shadow Recovery Algorithms, IEEE Transactions on Software Engineering, 14(2): 155-168 , Feb. 1988.

Kistler, et al., Disconnected Operation in the Coda File System, ACM Transactions on Computer Systems, vol. 10, No. 1, Feb. 1992, pp. 3-25.

Rosenblum, Mendel, The Design and Implementation of a Log-Structured File System, 1992 pp. 1-93.

Schiefer, Berni, et al., DB2 Universal Database Performance Tuning, Data Engineering Journal 22, 2 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, 2 1999 pp. 41-47.

Subramanian, Muralidhar, et al., Performance Challenges in Object-Relational DBMSs, Data Engineering Journal 22, 2 1999 pp. 28-32.

Weikum, Gerhard, et al., Towards Self-Tuning Memory Management for Data Servers, Data Engineering Journal 22, 2 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

"Notification of Transmittal of the International Search Report and the Written Opinion of the International Searching Authority, or the Declaration", mailed Apr. 24, 2006, International Application No. PCT/US2006/015242, 12 pages.

Kaczmarski et al. "Beyond Backup Toward Storage Management", IBM Systems Journal, vol. 42, No. 2, 2003, 8 pages.

Wilhelm-Olsen et al. "Data Protection Strategies for Network Appliance Storage Systems", Apr. 25, 2003, 13 pages.

Burns et al. "Storage Virtualization—Definition Why, What, Where and How?", Nov. 1, 2004, 3 pages.

Kang et al. "Improving Storage System Flexibility Through Virtual Allocation", Dept. of Electrical Engineering, Texas A&M University, College Station, Texas, 7 pages.

Kim et al., "Exploiting Metadata of Absent Objects for Proxy Cache Consistency", IEICE Transactions on Communications, vol. E-84B, No. 5, May 2001, pp. 1406-1412.

Caplinger, Michael, "An Information System Based on Distributed Objects", OOPSLA Proceedings, Oct. 4-8, 1987, pp. 126-137.

Lango et al., "System and Method for Sparse Volumes", U.S. Appl. No. 11/409,887, filed Apr. 24, 2006, 52 pages.

Rabinovich, M., et al., "Web Caching and Replication," Addison Wesley, Dec. 2001, pp. 47-61, 153-175 and 207-210.

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14$^{th}$ VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3):407-423, 1989.

Clark, Timothy A., et al., *Using the ISIS Resource Manager for Distributed, Fault-Tolerant Computing*, IEEE 1993, pp. 257-265.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, *Phoenix: A Safe In-Memory File System*. Communications of the ACM, 33(1):81-86, Jan. 1990.

Godbole, Rajesh, *An Introduction to FlexCache Volumes / Implementing File Caching on Filers*, Network Appliance, Inc., May 2005, pp. 1-14, TR3399.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

(56) References Cited

OTHER PUBLICATIONS

Howard, John, H. et al., *Scale and performance in a distributed file system*, ACM Trans. Computer. System., 6(1), Feb. 1988 pp. 51-81.
Howard, John H., *An Overview of the Andrew File System*, Carnegie Mellon University, CMU-ITC-88-062.
*The IBM System/38*, Chapter 8, pp. 137-15.
Isomaki, Markus, *Differentiated Service for the Internet*, Department of Technical Physics and Mathematics, May 9, 1998.
Kazar, Michael L., et al., *Decorum File System Architectural Overview*, USENIX Summer Conference, Anaheim, California, 1990.
Lango, Jason, et al., *Architecture for Supporting Sparse Volumes*, U.S. Appl. No. 60/674,641, filed Apr. 25, 2005.
Lango, Jason, et al., *Architecture for Supporting Sparse Volumes*, U.S. Appl. No. 11/409,624, filed Apr. 24, 2006.
Lango, Jason, *System and Method for Caching Network File Systems*, U.S. Appl. No. 60/674,609, filed Apr. 25, 2005.
Lomet, David., et al., *The performance of a multiversion access method*, ACM SIGMOD International Conference on Management of Data, 19:353-363.
Lorie, Raymond, A, *Physical integrity in a large segmented database*, ACM Trans. Database Systems, (2)1:91-104, Mar. 1977.
Lorie, RA, *Shadow Page Mechanism*, IBM Technical Disclosure Bulletin, Jun. 1986, pp. 340-342.
McKusick, Marshall Kirk, et al., *A Fast File System for UNIX*, Computer Science Division, Department of Electrical Engineering and Computer Sciences, Univ. of CA, Berkley, Feb. 18, 1994.
Miller, Ethan L., et al., *RAMA:A File System for Massively Parallel Computers*, $12^{th}$ IEEE Symposium on Mass Storage Systems, Monterey CA, Apr. 1993, pp. 163-168.
Moons, Herman et al., *Location-Independent Object Invocation in Open Distributed Systems*, Autumn 1991 EurOpen Technical Conference and Exhibition, pp. 287-300 (Sep. 16-20, 1991).
Morris, James H., et al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Orcas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Ousterhout, John K. et al., *The Sprite Network Operating System*, Computer Science Division, Department of Electrical Engineering and Computer Sciences, Univ. of CA, Berkley, Nov. 19, 1987.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Ousterhout, John, *Why Aren't Operating Systems Getting Faster as Fast as Hardware?*, Digital WRL Technical Note TN-11, Oct. 1989.
Ousterhout, John, *A Brief Retrospective on the Sprite Network Operating System*, found at http://www.cs.berkeley.edu/projects/sprite/retrospective.html,visited on Mar. 11, 2005.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).
Peterson, Zachary Nathaniel Joseph, *Data Placement for Copy-on-Write Using Virtual Contiguity*, University of CA, Santa Cruz, Master of Science in Computer Science Thesis, Sep. 2002.
Quinlan, Sean, *A Cached WORM File System*, Software-Practice and Experience, 21(12):1289-1299 (1991).
Redundant Array of Independent Disks, from Wikipedia, the free encyclopedia, found at http://en.wikipedia.org/wiki/RAID, visited on Mar. 9, 2005.
Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.
Rosenblum, Mendel, et al., *The LFS Storage Manager*, Computer Science Division, Electrical Engin. and Computer Sciences, Univ. of CA, presented at Summer '90 USENIX Technical Conference, Anaheim, CA Jun. 1990.
Rosenblum, Mendel, et al, *The Design and Implementation of a Log-Structured File System* Jul. 24, 1991 pp. 1-15.
Rosenblum, Mendel, et al., *The Design and Implementation of a Log-Structured File System*, , In Proceedings of ACM Transactions on Computer Systems, (10)1:26-52, Feb. 1992.
Sandberg, Russel et al., *Design and implementation of the Sun Network Filesystem*. In Proc. Summer 1985 USENIX Conf., pp. 119-130, Portland OR (USA), Jun. 1985.
Santry, Douglas S., et al., *Deciding When to Forget in the Elephant File System*, Operating Systems Review, 34(5), (Dec. 1999) pp. 110-123.
Satyanarayanan, M., et al., *The ITC Distributed File System: Principles and Design*, In Proceedings of the 10th ACM Symposium on Operating Systems Principles, (19)5:56-67, Dec. 1985.
Satyanarayanan,.M.. *A survey of distributed file-systems*. Annual Review of Computing Science, 4(73-104), 1989.
Satyanarayanan, M., et al, *Coda: A highly available file system for a distributed workstation environment* Carnegie Mellon University, CMU-ITC.
Satyanarayanan, M., et al, *Coda: A highly available file system for a distributed workstation environment*. IEEE Transactions on Computers, 39(4):447-459, 1990.
Satyanarayanan, Mahadev, *Scalable, Secure, and Highly Available Distributed File Access*, Computer May 1990: 9-21.
Sidebotham, Bob, *Volumes: The Andrew File System Data Structuring Primitive*, EEUG Conference Proceedings, Manchester, UK, Autumn 1986.
User Guide found at http://www.openafs.org/pages/doc/UserGuide/auusg004.htm, visited on Mar. 2, 2005.
Welch, Brent B., et al., *Pseudo Devices: User-Level Extensions to the Sprite File System*, Computer Science Division, Department of Electrical Engineering and Computer Sciences, Univ. of CA, Berkley, Apr. 1988.
Welch, Brent B., et al., *Pseudo-File-Systems*, Computer Science Division, Department of Electrical Engineering and Computer Sciences, Univ. of CA, Berkley, Oct. 1989.
Wittle, Mark, et al, LADDIS: The next generation in NFS file server benchmarking, USENIX Association Conference Proceedings, Apr. 1993.
"Notification of Transmittal of the International Search Report and the Written Opinion of the International Searching Authority, or the Declaration" PCT/US2006/015279 Apr. 24, 2006.
"An Introduction to Flexcache Vlumes Implementing File Caching on Filers" Rajesh Goodboie May 2005.

\* cited by examiner

SYSTEM AND METHOD FOR CACHING NETWORK FILE SYSTEMS

CROSS-REFERENCE TO RELATED APPLICATIONS

The present application is a continuation of commonly assigned copending U.S. patent application Ser. No. 13/206,705, which was filed on Aug. 10, 2011, by Jason Ansel Lango et al. for a SYSTEM AND METHOD FOR CACHING NETWORK FILE SYSTEMS which is a continuation of commonly assigned copending U.S. patent application Ser. No. 11/409,625, which was filed on Apr. 24, 2006, by Jason Ansel Lango et al. for a SYSTEM AND METHOD FOR CACHING NETWORK FILE SYSTEMS which claims the benefit of U.S. Provisional Patent Application Ser. No. 60/674,609, which was filed on Apr. 25, 2005, by Jason Lango for a System And Method For Caching Network File Systems and are hereby incorporated by reference.

The present invention is related to the following commonly assigned U.S. patent application Ser. No. 11/409,887, filed on Apr. 24, 2006, titled System and Method for Sparse Volumes, Ser. No. 11/409,624, filed on Apr. 24, 2006, titled Architecture for Supporting of Sparse Volumes, which is now issued as U.S. Pat. No. 7,689,609 on Mar. 30, 2010 and Ser. No. 11/409,626, filed on Apr. 24, 2006, titled System and Method for Restoring Data On Demand for Instant Volume Restoration, which is now issued as U.S. Pat. No. 7,809,693 on Oct. 5, 2010, the contents of which are hereby incorporated by reference.

FIELD OF THE INVENTION

The present invention relates to caching systems, and more specifically, to storage virtualization of data served by a caching filer in response to data access requests issued by multi-protocol clients over a computer network.

BACKGROUND OF THE INVENTION

Often, organizations with remote locations may need to replicate critical data, such as engineering applications and libraries, to different locations. In order to make such critical data available to users in those remote locations without incurring network delays, the organizations may consume substantial resources (such as, e.g., file systems executing on file servers) managing a complex replication infrastructure and process. Data replication is a known technique that enables distributed online access to generally read-only data sets. Traditional data replication may rely heavily on file system mirroring to create entire read-only copies of data sets on distributed servers.

The mirrors generated by file system mirroring typically require a large amount of administrative overhead. For example, an administrator must determine what data needs to be replicated, as well as manage physical resources (file systems, files servers, etc.) for each mirror. As data sets grow, this type of data replication becomes increasingly impractical. In addition, the replication infrastructure may require the presence of servers in remote locations to store the replicated data, thus preventing organizations from consolidating their server infrastructures to a central location. Therefore, there remains a need to eliminate this expensive replication infrastructure and process without losing the benefit of immediate access to critical data.

One alternative to data replication mirroring is proxy caching. Proxy caching systems are typically employed to transparently replicate data sets on demand. A typical proxy cache system includes a front-end storage system or "proxy device" having local storage, i.e., a "cache", coupled to a back-end storage system or "origin server" having remote storage. When a client request cannot be satisfied by the cache, it is proxied to the origin server. The server response is, in turn, proxied back to the requesting client and all associated data is cached in the local storage. This type of transaction is called a "cache miss". Cache misses typically result in the data, such as file system data, being "filled" into the cache. When the data required to satisfy a client request is available in the cache, the proxy device may construct and send a response without communicating with its associated server. Such a transaction is called a "cache hit". Using cache miss transactions, a proxy device allows clients to modify the state of a file system on the device. In contrast to standard replicas, this enables automatic replication without constraining clients to read-only access.

A conventional proxy caching solution provides the ability to distribute data, e.g., files, to remote locations without the need for continuous hands-on administrative management. An example of such a proxy caching solution is described in U.S. patent application Ser. No. 10/245,798 titled Apparatus and Method for a Proxy Cache, by E. Ackaouy, now issued as U.S. Pat. No. 7,284,030 on Oct. 6, 2007 and assigned to Network Appliance, Inc., Sunnyvale, Calif. A proxy storage system or appliance having a cache is coupled to a server storage system. A file system manages a set of files served by the proxy appliance; these files are accessed by clients using a file system protocol, such as the Network File System (NFS) and/or Common Internet File System (CIFS) protocol. In response, the proxy appliance serves the files using a file index hashing scheme based on file handles.

Broadly stated, the proxy appliance "listens" for a NFS/CIFS data access request issued by a client and determines whether it can serve that request locally using the hashing scheme. To that end, the proxy appliance converts the client request to a unique caching name before forwarding to its file system for a caching decision. A hashing function performed on the file handle produces the caching name, which is used by the file system to obtain a cache file or object store identifier to determine if the file is resident in the cache. If the file is resident in the cache, a determination is made as to whether all of the data that is requested by the client is resident in the cache. If not, the appliance proxies the request over to the server. When the server responds with the requested data or acknowledgement, the appliance passes the server response to the client. The proxy appliance also "fills" its cache with the server response to ensure that subsequent client requests may be served by the appliance.

The present invention is directed, in part, to an improved caching system that enables multi-protocol access by clients to data served by the system. In addition, the present invention is directed, in part, to an improved caching system that enables efficient client access to data served by the system using file system data structures and names. Moreover, the present invention is directed, in part, to an improved caching system that provides storage virtualization of data served by the system in response to multi-protocol data access requests issued by clients. In this context, storage virtualization denotes presenting a transparent view of storage to a client that involves cooperating storage resources from multiple storage systems, typically across a network.

SUMMARY OF THE INVENTION

The present invention relates to a network caching system having a multi-protocol caching storage system ("filer"

coupled to an origin server to provide storage virtualization of data served by the filer in response to data access requests issued by multi-protocol clients over a computer network. The multi-protocol caching filer includes a file system configured to manage a sparse volume to thereby provide a cache function that enables access to data by the multi-protocol clients. To that end, the caching filer further includes a multi-protocol engine configured to translate the multi-protocol client data access requests into generic file system primitive operations executable by both the caching filer and the origin server.

In the illustrative embodiment, the cache function is provided, in part, by a "local cache" of the caching filer that includes a cache volume comprising one or more disks coupled to the caching filer. According to an aspect of the invention, the cache volume is illustratively embodied as a sparse volume adapted to serve data requested by a client from one or more storage objects, e.g., files, having at least one block (i.e., an absent block) that may be missing from the cache volume (i.e., not stored locally on its disk). The missing data of an absent block is stored on the origin server and is illustratively retrieved ("filled") using a remote fetch operation in a manner that is transparent to the client.

Advantageously, the present invention utilizes the storage space of the multi-protocol caching filer to enable fast and efficient client access to data served by the network caching system. Unlike previous caching systems that require explicit file handle-to-object store conversion, the novel multi-protocol caching filer enables efficient client access to data served by the network caching system through use of the file system and, in particular, the use of actual names of the storage objects (files) organized by the file system. Moreover, the file system cooperates with the sparse volume of the caching filer to provide storage space virtualization of the served data in a manner that is transparent to the multi-protocol clients

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN
ILLUSTRATIVE EMBODIMENT

A. Network Environment

Figure 1:
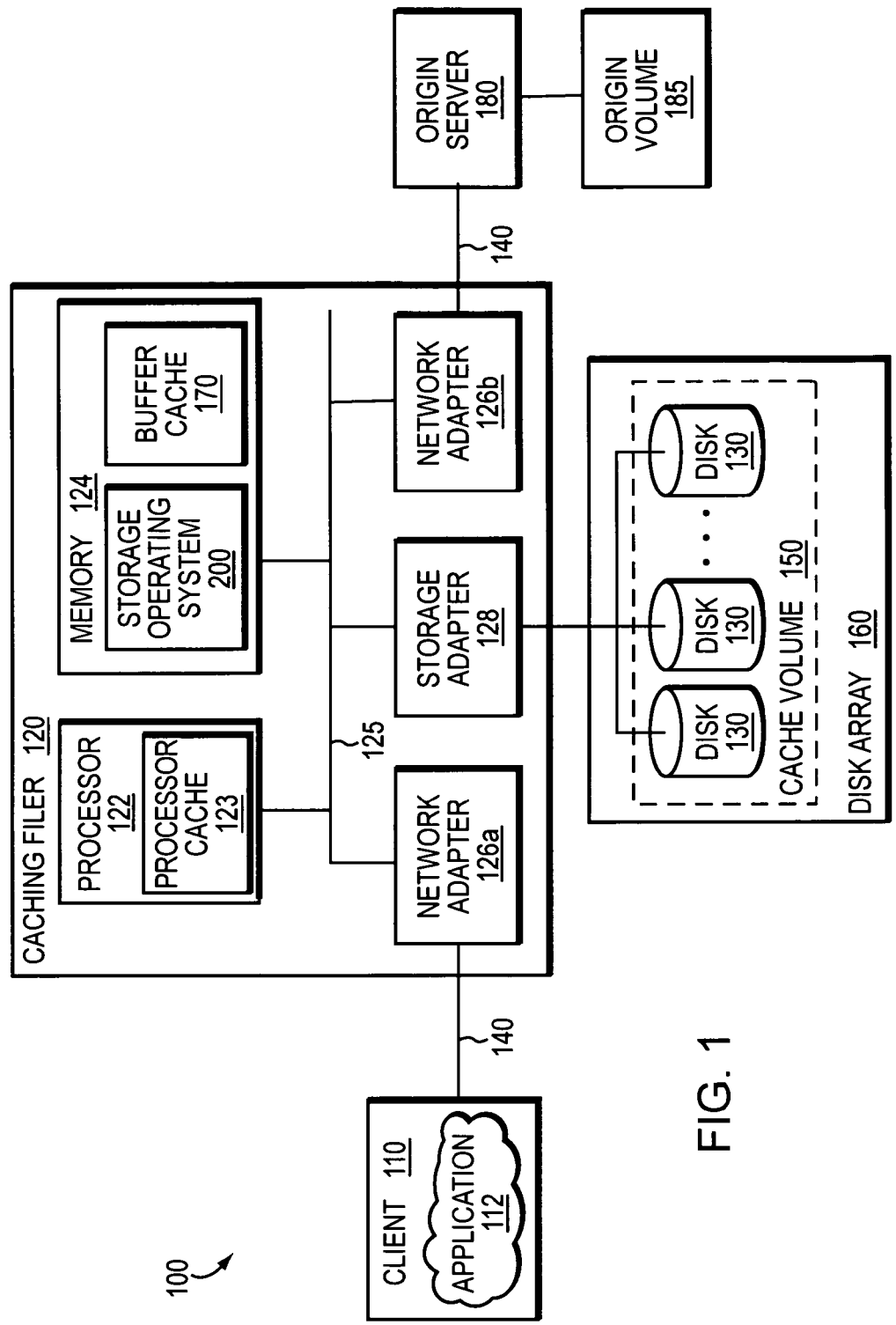
FIG. 1 is a schematic block diagram of an exemplary network environment in accordance with an embodiment of the present invention.

FIG. 1 is a schematic block diagram of a network caching system environment 100 that includes a front-end storage system configured to provide a cache function for serving information (data) sourced from a back-end storage system. To that end, the front-end storage system is a computer illustratively embodied as a caching filer 120 that provides storage service relating to the organization of information on storage devices, such as disks 130 of a disk array 160. The caching filer 120 comprises a processor 122, a memory 124, one or more network adapters 126a, b and a storage adapter 128 interconnected by a system bus 125. The caching filer 120 also includes a storage operating system 200 that preferably implements a high-level module, such as a file system, to logically organize the information as named file, directory, and virtual disk (hereinafter special file or "block") storage objects on the disks.

In the illustrative embodiment, the memory 124 comprises storage locations that are addressable by the processor and adapters for storing software program code. A portion of the memory may be further organized as a buffer cache 170 for storing data structures associated with the present invention. The processor and adapters may, in turn, comprise processing elements and/or logic circuitry configured to execute the software code and manipulate the data structures. Storage operating system 200, portions of which is typically resident in memory and executed by the processing elements, functionally organizes the filer 120 by, inter alia, invoking storage operations executed by the filer. It will be apparent to those skilled in the art that other processing and memory means, including various computer readable media, may be used for storing and executing program instructions pertaining to the inventive technique described herein.

The network adapters 126a, b (hereinafter referred to generally as "network adapter 126") comprise the mechanical, electrical and signaling circuitry needed to connect the caching filer to a client and to the back-end storage system over a computer network 140, which may comprise a point-to-point connection or a shared medium, such as a local area network (LAN) or wide area network (WAN). Illustratively, the computer network 140 may be embodied as an Ethernet network or a Fibre Channel (FC) network. The client 110 may communicate with the filer 120 over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the caching filer 120 in accordance with a client/server model of information delivery. That is, the client may request the services of the caching filer, and the filer may return the results of the services requested by the client, by exchanging packets over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the filer 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data stripes across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

In an illustrative embodiment, the cache function of the caching filer 120 is provided, in part, by a "local cache". In this context, the local cache denotes a cache memory hierarchy that includes (i) a high-level processor cache 123, (ii) an intermediate-level buffer cache 170 and (iii) a low-level "tertiary" cache volume 150 comprising one or more disks 130 coupled to the filer. According to an aspect of the invention described further herein, the cache volume 150 is illustratively embodied as a sparse volume adapted to serve data requested by a client 110 from one or more storage objects, e.g., files, having at least one block (i.e., an absent block) that may be missing from the cache volume 150 (i.e., not stored locally on its disk). The missing data of an absent block is stored on the back-end storage system and is illustratively retrieved ("filled") using a remote fetch operation in a manner that is transparent to the client.

The back-end storage system is a computer illustratively embodied as an origin server 180 that, like caching filer 120, provides storage service relating to the organization of information on disks organized as an origin volume 185. The origin server 180 is operatively interconnected with the caching filer 120 over network 140 and generally comprises hardware similar to filer 120. However, the origin server 180 may alternatively execute a modified storage operating system that adapts that storage system for use as an origin server. In an alternate embodiment described further herein, there may be a plurality of caching filers 120 coupled to origin server 180 in network caching system environment 100.

B. Storage Operating System

To facilitate access to the disks 130, the storage operating system 200 implements a write-anywhere file system that cooperates with virtualization modules to manage the cache (sparse) volume 150 and "virtualize" the storage space provided by disks 130. The file system logically organizes the information as a hierarchical structure of named directories and files on the disks. Each on-disk file may be implemented as set of disk blocks configure to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 2:
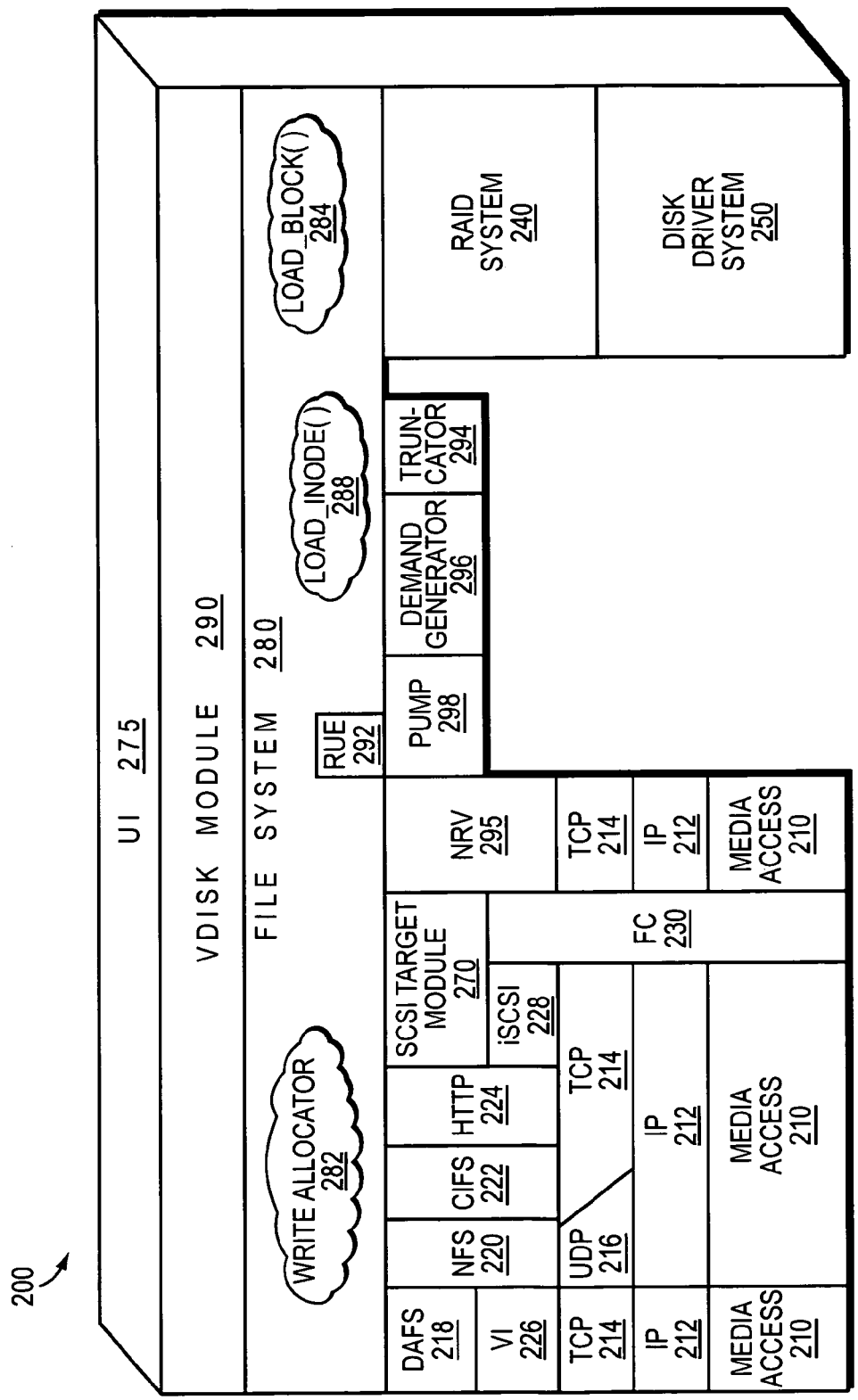
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for multi-protocol clients to access information stored on the caching filer using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the caching filer. The FC and iSCSI drivers provide FC-specific and iSCSI-specific access control to the blocks and, thus, manage exports of luns to either iSCSI or FCP or, alternatively, to both iSCSI and FCP when accessing the blocks on the filer. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

The storage operating system 200 further comprises a NetApp Remote Volume (NRV) protocol layer 295 that interfaces with file system 280. The NRV protocol is generally utilized for remote fetching of data blocks that are not stored locally on disk. However, as described herein, the NRV protocol may be further utilized in caching filer-to-origin server communication to fetch absent blocks in the sparse cache volume 150 in accordance with the principles of the present invention. It should be noted that, in alternate embodiments, conventional file/block level protocols, such as the NFS protocol, or other proprietary block fetching protocols may be used in place of the NRV protocol within the teachings of the present invention.

As described further herein, a demand generator 296 of the storage operating system 200 is used to systematically retrieve data blocks that are not stored locally on disk, i.e., on cache volume 150 of caching filer 120, while a pump module 298 may be used to regulate the retrieval of those and other data blocks requested from the origin server 180. Moreover, in accordance with the present invention, a truncator 294 implements a cache ejection policy to reclaim storage space as the local cache (e.g., cache volume 150) becomes full and a Remote Update Engine (RUE 292) is used to forward any file system operations that would modify the cache volume 150 to the origin server 180. Although shown and described herein as separate software modules, the demand generator 296, pump 298, truncator 294 and RUE 292 may be alternatively integrated within a single module of the operating system 200. Moreover, it should be noted that these modules may be implemented as hardware, software, firmware, or any combination thereof.

Bridging the disk software layers with the multi-protocol engine layers is a virtualization system that is implemented by file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (such as a system administrator) issuing commands to the filer. The UI 275 is disposed over the storage operating system in a manner that enables administrative or user access to the various layers and systems. The SCSI target module 270 is disposed between the FC and iSCSI drivers 228, 230 and the file system 280 to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

Operationally, a request from the client 110 is forwarded as a packet over the computer network 140 and onto the caching filer 120 where it is received at the network adapter 126. A network driver (of layer 210 or layer 230) processes the packet and, if appropriate, passes it on to a network protocol and file access layer for additional processing prior to forwarding to the write-anywhere file system 280. As described further herein, if the request modifies data stored on the cache volume 150, the caching filer 120 conveys the request to the origin server 180 via an NRV write request. However, if the request does not modify data on the volume 150, the request is passed directly into the file system 280, which attempts to service the request. If the data is not resident on the local cache (resulting in a "cache miss"), the caching filer sends an NRV read request to the origin server 180 to fetch the missing data. Upon receiving a response from the server 180, the caching filer stores the fetched data in its local cache, constructs a reply with the requested data and returns that reply to the client 110.

However, if the requested data is resident in the local cache, the caching filer (file system 280) services that request. To that end, the file system generates operations to load (retrieve) the requested data from disk 130 if it is not resident "in core", i.e., in the buffer cache 170. Illustratively this operation may be embodied as a Load_Block( ) function 284 of the file system 280. If the information is not in the cache 170, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the filer. Upon completion of the request, the filer (and operating system) returns a reply to the client 110 over the network 140.

The file system 280 generally provides the Load_Block( ) function 284 to retrieve one or more blocks from disk. These blocks may be retrieved in response to a read request or an exemplary read ahead algorithm directed to, e.g., a file. As described further herein, if any requested blocks within a buffer tree of the file contain a special ABSENT value (thereby denoting absent blocks), then the Load_Block( ) function 284 initiates a fetch operation to retrieve the absent blocks from an appropriate backing store (such, e.g., origin server 180) using the illustrative NRV protocol 295. Once the blocks (including any data blocks) have been retrieved, the Load_Block( ) function 284 returns with the requested data. The NRV protocol is further described in the above-referenced U.S. Pat. No. 7,689,609, issued Mar. 30, 2010, entitled Architecture for Supporting of Sparse Volumes, by Jason Lango et al. However, it should be noted that any other suitable file or block based protocol that can retrieve data from a remote backing store, including, e.g., the NFS protocol, can be advantageously used with the present invention. The file system also illustratively includes a Load_Inode( ) function 288 that retrieves inode and file geometry when first accessing a file.

It should be further noted that the software path through the storage operating system layers described above needed to perform data storage access for the client request received at the caching filer may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by filer 120 in response to a request issued by client 110. Moreover, in another alternate embodiment of the invention, the processing elements of adapters 126, 128 may be configure to offload some or all of the packet processing and storage access operations, respectively, from processor 122, to thereby increase the performance of the storage service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a caching filer, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., file server, filer or multi-protocol storage appliance) or general-purpose computer, including a standalone computer or portion thereof, embodied as or including a storage system. An example of a multi-protocol storage appliance that may be advantageously used with the present invention is described in U.S. patent application Ser. No. 10/215,917 titled Multi-protocol Storage Appliance that Provides Integrated Support for File and Block Access Protocols, filed on Aug. 9, 2002, which was published as U.S. Patent Publication No. 2004/0030668 A1 on Feb. 12, 2004, now issued as U.S. Pat. No. 7,873,700. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. File System Organization

Figure 3:
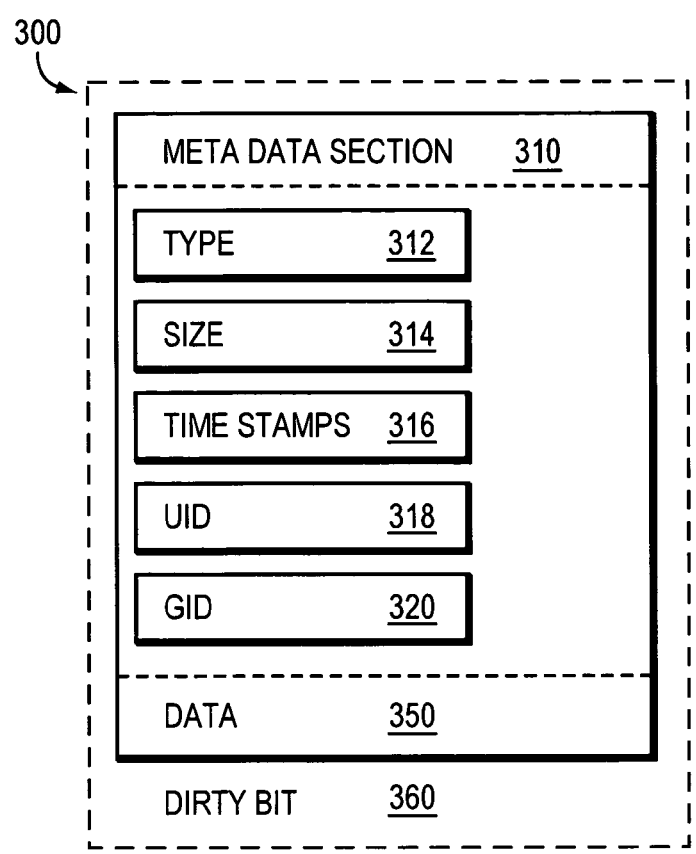
FIG. 3 is a schematic block diagram of an exemplary inode in accordance with an embodiment of the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification times) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 350 of the inode (e.g., a second level inode) references an indirect block (e.g., a first level block) that contains up to 1024 pointers, each of which references a 4 kB data block on disk. For file system data having a size greater than 64 MB, each pointer in the data section 350 of the inode (e.g., a third level inode) references a double-indirect block (e.g., a second level block) that contains up to 1024 pointers, each referencing an indirect (e.g., a first level) block. The indirect block, in turn, contains 1024 pointers, each of which references a 4 kB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a dirty bit 360. After data in the inode (or block) is updated/modified as instructed by, e.g., a write operation, the modified data is marked dirty using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled Method for Maintaining Consistent States of a File System and for Creating User-Accessible Read-Only Copies of a File System by David Hitz et al., issued on Oct. 6, 1998.

Figure 4:
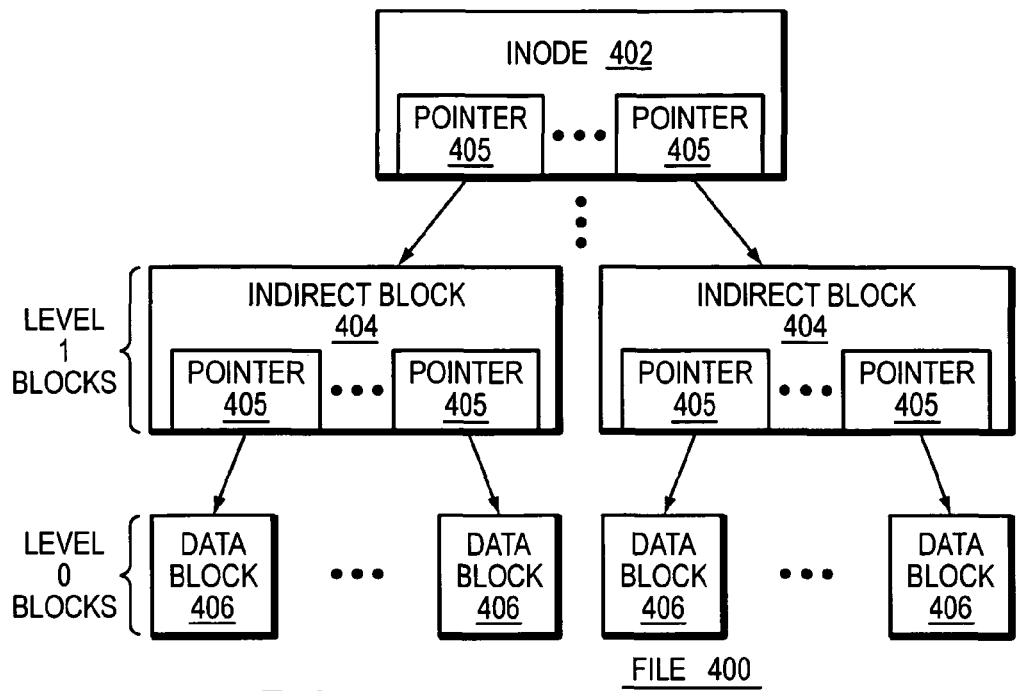
FIG. 4 is a schematic block diagram of an exemplary buffer tree in accordance with an embodiment of the present invention.

FIG. 4 is a schematic block diagram of an embodiment of a buffer tree of a file that may be advantageously used with the present invention. The buffer tree is an internal representation of blocks for a file (e.g., file 400) loaded into the buffer cache 170 and maintained by the write-anywhere file system 280. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (vvols) of a storage system, such as caching filer 120. An example of such a file system layout is described in U.S. patent application Ser. No. 10/836,817 titled Extension of Write Anywhere File System Layout, by John K. Edwards et al., now issued as U.S. Pat. No. 7,409,494 on Aug. 5, 2008, and assigned to Network Appliance, Inc. The underlying physical volume is an aggregate comprising one or more groups of disks, such as RAID groups, of the caching filer. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

In one embodiment, pvbns are used as block pointers within buffer trees of files (such as file 400) stored in a vvol. This "hybrid" vvol embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk,dbn occurs at the file system/RAID system boundary of the storage operating system 200.

Figure 5:
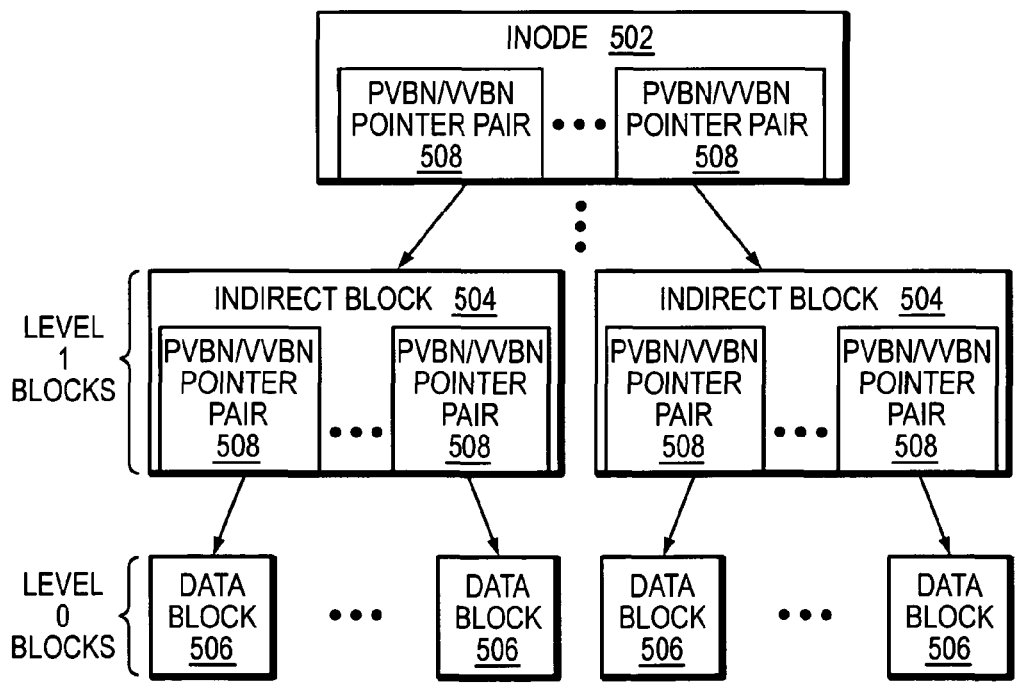
FIG. 5 is a schematic block diagram of an illustrative embodiment of a buffer tree of a file that may be advantageously used with the present invention.

In an illustrative dual vbn hybrid ("flexible") vvol embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 5 is a schematic block diagram of an illustrative embodiment of a buffer tree of a file 500 that may be advantageously used with the present invention. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 508 that ultimately reference data blocks 506 used to store the actual data of the file.

The pvbns reference locations on disks of the aggregate, whereas the vvbns reference locations within files of the vvol. The use of pvbns as block pointers 508 in the indirect blocks 504 provides efficiencies in the read paths, while the use of vvbn block pointers provides efficient access to required metadata. That is, when freeing a block of a file, the parent indirect block in the file contains readily available vvbn block pointers, which avoids the latency associated with accessing an owner map to perform pvbn-to-vvbn translations; yet, on the read path, the pvbn is available.

As noted, each inode has 64 bytes in its data section that, depending upon the size of the inode file (e.g., greater than 64 bytes of data), function as block pointers to other blocks. For traditional and hybrid volumes, those 64 bytes are embodied as 16 block pointers, i.e., sixteen (16) 4 byte block pointers. For the illustrative dual vbn flexible volume, the 64 bytes of an inode are embodied as eight (8) pairs of 4 byte block pointers, wherein each pair is a vvbn/pvbn pair. In addition, each indirect block of a traditional or hybrid volume may contain up to 1024 (pvbn) pointers; each indirect block of a dual vbn flexible volume, however, has a maximum of 510 (pvbn/vvbn) pairs of pointers.

Moreover, one or more of pointers 508 may contain a special ABSENT value to signify that the object(s) (e.g., an indirect block or data block) referenced by the pointer(s) is not locally stored (e.g., on the cache volume 150) and, thus, must be fetched (retrieved) from the origin volume 185 of origin server 180. In the illustrative embodiment, the Load_Block ( ) function 284 of file system 280 interprets the content of the each pointer and, if a requested block is ABSENT, initiates transmission of an appropriate request (e.g., a remote fetch operation) for the data to the origin server 180 using, e.g. the NRV protocol.

It should be noted that the cache volume 150 is illustratively embodied as a flexible vvol, whereas the origin volume 185 could be either a flexible vvol or a traditional volume, primarily because of the use of a logical file protocol (NRV). As noted, a traditional volume and flexible vvol differ in their indirect block format; however, the indirect block format difference is irrelevant in the case of the network caching system. In other words, because there is no physical relationship between the cache volume and the origin volume, the origin volume's type is irrelevant.

Figure 6:
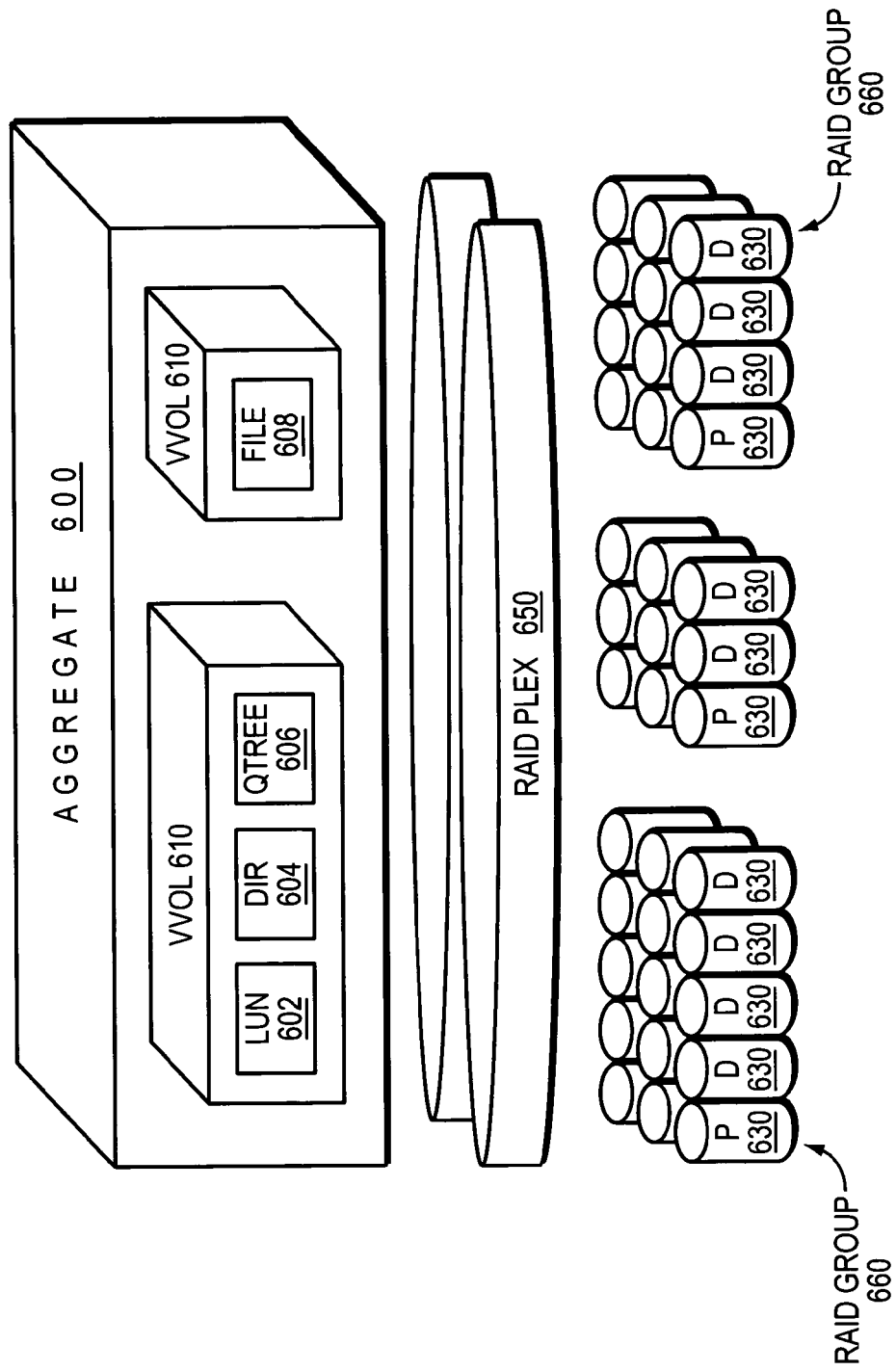
FIG. 6 is a schematic block diagram of an exemplary aggregate in accordance with an embodiment of the present invention.

FIG. 6 is a schematic block diagram of an embodiment of an aggregate 600 that may be advantageously used with the present invention. Luns (blocks) 602, directories 604, qtrees 606 and files 608 may be contained within vvols 610, such as dual vbn flexible vvols, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a vvol is analogous to a file within that physical volume. That is, the aggregate 600 may include one or more files, wherein each file contains a vvol 610 and wherein the sum of the storage space consumed by the vvols is physically smaller than (or equal to) the size of the overall physical volume. The aggregate utilizes a physical pvbn space that defines a storage space of blocks provided by the disks of the physical volume, while each embedded vvol (within a file) utilizes a logical vvbn space to organize those blocks, e.g., as files. Each vvbn space is an independent set of numbers that corresponds to locations within the file, which locations are then translated to dbns on disks. Since the vvol 610 is also a logical volume, it has its own block allocation structures (e.g., active, space and summary maps) in its vvbn space.

A container file is a file in the aggregate that contains all blocks used by a vvol. The container file is an internal (to the aggregate) feature that supports a vvol; illustratively, there is one container file per vvol. Similar to a pure logical volume in a file approach, the container file is a hidden file (not accessible to a user) in the aggregate that holds every block in use by the vvol. The aggregate includes an illustrative hidden metadata root directory that contains subdirectories of vvols:

WAFL/fsid/filesystem file, storage label file

Specifically, a physical file system (WAFL) directory includes a subdirectory for each vvol in the aggregate, with the name of subdirectory being a file system identifier (fsid) of the vvol. Each fsid subdirectory (vvol) contains at least two files, a filesystem file and a storage label file. The storage label file is illustratively a 4 kB file that contains metadata similar to that stored in a conventional raid label. In other words, the storage label file is the analog of a raid label and, as such, contains information about the state of the vvol such as, e.g., the name of the vvol, a universal unique identifier (uuid) and fsid of the vvol, whether it is online, being created or being destroyed, etc.

Figure 7:
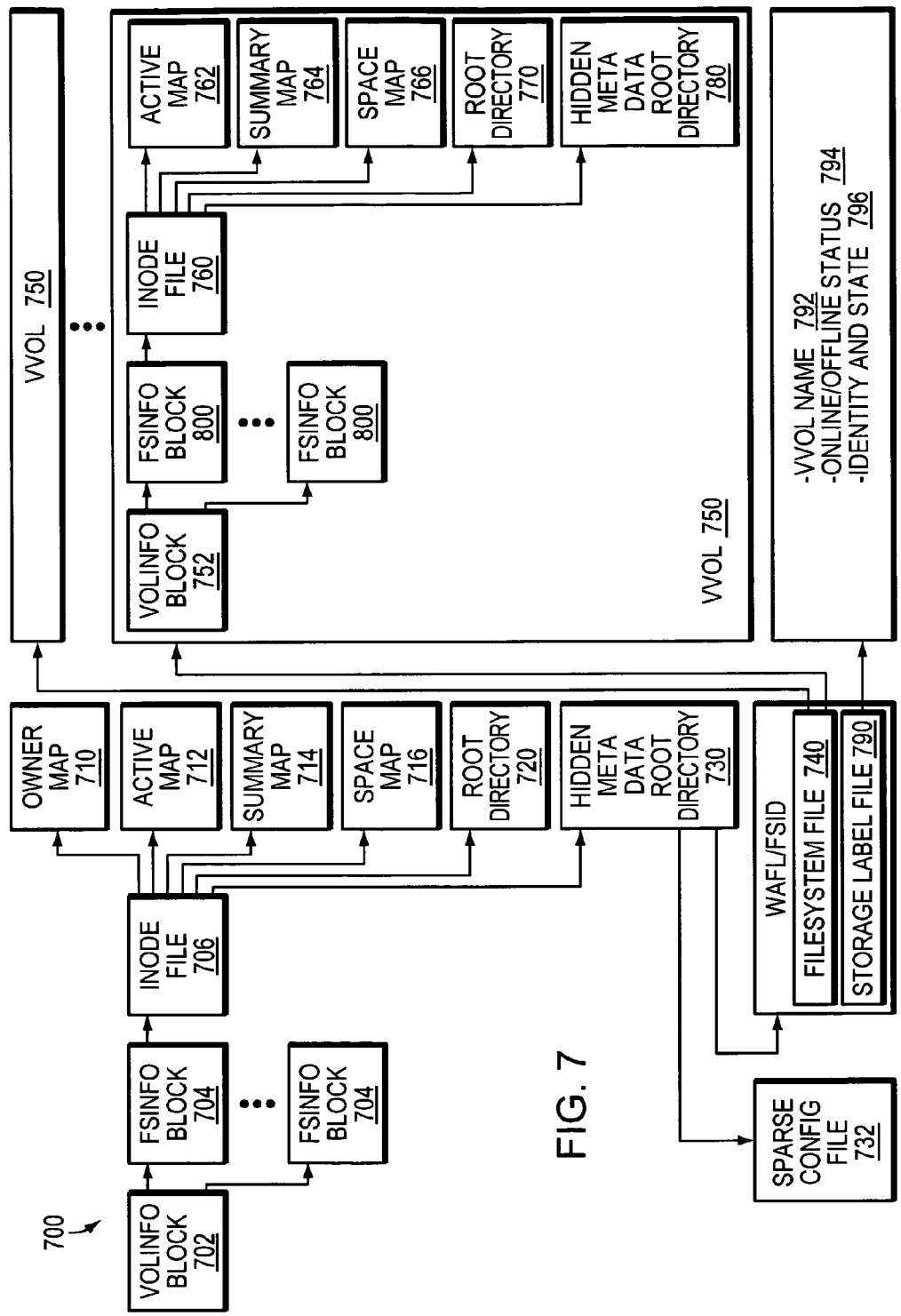
FIG. 7 is a schematic block diagram of an exemplary on-disk layout in accordance with an embodiment of the present invention.

FIG. 7 is a schematic block diagram of an on-disk representation of an aggregate 700. The storage operating system 200, e.g., the RAID system 240, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714 and a space map 716, as well as other special metadata files. The inode file 706 further includes a root directory 720 and a "hidden" metadata root directory 730, the latter of which includes a namespace having files related to a vvol in which users cannot "see" the files. The hidden metadata root directory includes the WAFL/fsid/directory structure that contains filesystem file 740 and storage label file 790. Note that root directory 720 in the aggregate is empty; all files related to the aggregate are organized within the hidden metadata root directory 730.

The hidden metadata root directory 730 also includes, per vvol, a sparse configuration metafile ("sparse config file" 732) if the vvol is a sparse volume. The sparse config file 732 is thus associated with a sparse volume and, to that end, identifies (among other things) the host name of the origin server 180 and the origin volume 185. During a mount process of the sparse volume, the sparse config file 732 is retrieved and converted into an in-core format. Notably, the sparse config file also includes identifiers that indicate whether the sparse volume is a cache volume 150. These identifiers allow the caching filer 120 to determine whether it should perform remote updates or local updates for various client requests; as described further herein, the caching filer of the network caching system environment 100 illustratively performs remote updates.

In addition to being embodied as a container file having level 1 blocks organized as a container map, the filesystem file 740 includes block pointers that reference various file systems embodied as vvols 750. The aggregate 700 maintains these vvols 750 at special reserved inode numbers. Each vvol 750 also has special reserved inode numbers within its vvol space that are used for, among other things, the block allocation bitmap structures. As noted, the block allocation bitmap structures, e.g., active map 762, summary map 764 and space map 766, are located in each vvol.

Specifically, each vvol 750 has the same inode file structure/content as the aggregate, with the exception that there is no owner map and no WAFL/fsid/filesystem file, storage label file directory structure in a hidden metadata root directory 780. To that end, each vvol 750 has a volinfo block 752 that points to one or more fsinfo blocks 800, each of which may represent a snapshot, along with the active file system of the vvol. Each fsinfo block, in turn, points to an inode file 760 that, as noted, has the same inode structure/content as the aggregate with the exceptions noted above. Each vvol 750 has its own inode file 760 and distinct inode space with corresponding inode numbers, as well as its own root (fsid) directory 770 and subdirectories of files that can be exported separately from other vvols.

The storage label file 790 contained within the hidden metadata root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated vvol 750, the online/offline status 794 of the vvol, and other identity and state information 796 of the associated vvol (whether it is in the process of being created or destroyed).

D. Sparse Volume

Figure 8:
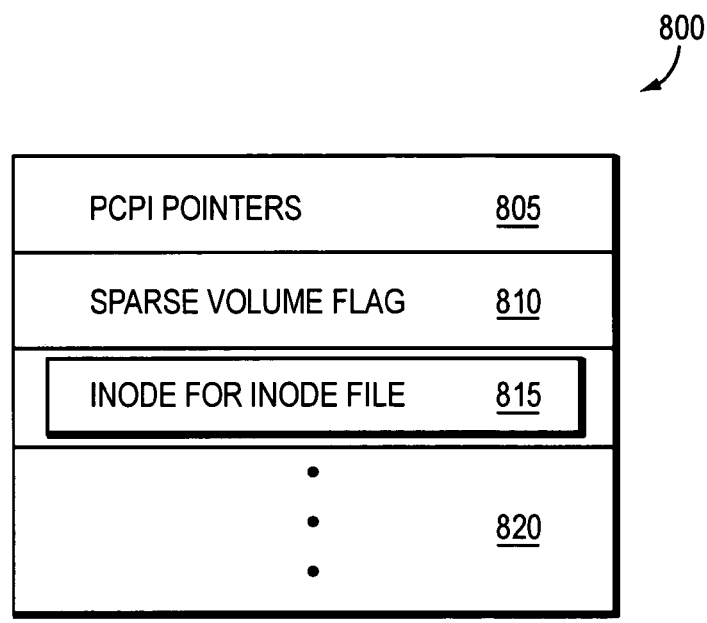
FIG. 8 is a schematic block diagram of an exemplary fsinfo block in accordance with an embodiment of the present invention.

As noted, the cache volume 150 is illustratively embodied as a sparse volume and, accordingly, the terms "cache volume 150" and "sparse volume 150" may be used interchangeably hereinafter. The sparse volume 150 is identified by a special marking of an on-disk structure of the volume (vvol) to denote the inclusion of a file with an absent block. FIG. 8 is a schematic block diagram of the on-disk structure, which illustratively is an exemplary fsinfo block 800. The fsinfo block 800 includes a set of persistent consistency point image (PCPI) pointers 805, a sparse volume flag field 810, an inode for the inode file 815 and, in alternate embodiments, additional fields 820. The PCPI pointers 805 are dual vbn (vvbn/pvbn) pairs of pointers to PCPIs (snapshots) associated with the file system. The sparse volume flag field 810 identifies whether the vvol described by the fsinfo block is sparse. In the illustrative embodiment, a flag is asserted in field 810 to identify the volume as sparse. The sparse volume flag field 810 may be further embodied as a type field identifying the type of a vvol associated with the fsinfo block. The inode for the inode file 815 includes the inode containing the root-level pointers to the inode file 760 (FIG. 7) of the file system associated with the fsinfo block.

Appropriate block pointer(s) of the file are marked (labeled) with special ABSENT value(s) to indicate that certain block(s), including data and/or indirect blocks, within the sparse volume 150 are not physically located on the caching filer serving the volume. The special ABSENT value further alerts the file system that the data is to be obtained from the alternate source, namely origin server 180. In response to a data access request, the Load_Block( ) function 284 of the file system 280 detects whether an appropriate block pointer of a file is marked as ABSENT and, if so, transmits a remote NRV fetch (e.g., read) operation message from the caching filer to the origin server to fetch the required data. The fetch operation illustratively requests one or more file block numbers (fbns) of the file stored on the origin volume 185. It should be noted that while the present description is written in terms of a single origin volume, the principles of the present invention may be applied to an environment where a single sparse volume is supported by a plurality of origin volumes, each of which may support the entire or a subset of the sparse volume. As such, the teachings should not be taken to be limited to a single origin volume.

The origin server 180 retrieves the requested data from its storage devices and returns the requested data to the caching filer 120, which processes the data access request and stores the returned data in its memory 124. Subsequently, the file system 280 "flushes" (writes) the data stored in memory to local disk during a write allocation procedure. This could be in response to the data being marked as "dirty," or other notation denoting to the file system that the data must be write allocated. In accordance with an illustrative write anywhere policy of the procedure, the file system 280 assigns pointer values (other than ABSENT values) to indirect block(s) of the file to thereby identify location(s) of the data stored locally within the cache volume 150. Thus, the remote fetch operation is no longer needed to access the data.

It should be noted that all NRV messages transmitted over the network 140 between the caching filer 120 and origin server 180 involve logical file addresses as opposed to physical disk addresses. Accordingly, there is no need to size the caching filer storage in any relation to the origin server storage. When the requested data is provided to the caching filer, that data is write allocated and accorded the appropriate vvbn (and/or pvbn) block numbering. In other words, write allocation of the cache volume 150 is totally distinct from write allocation on the origin volume 185.

An example of a write allocation procedure that may be advantageously used with the present invention is described in U.S. patent application Ser. No. 10/836,090 titled, Extension of Write Anywhere File Layout Write Allocation, by John K. Edwards, now issued as U.S. Pat. No. 7,430,571 on Sep. 30, 2008, which application is hereby incorporated by reference. Broadly stated, block allocation proceeds in parallel on the flexible vvol and aggregate when write allocating a block within the vvol, with a write allocator 282 (FIG. 2) selecting an actual pvbn in the aggregate and a vvbn in the vvol. The write allocator adjusts block allocation bitmap structures, such an active map and space map, of the aggregate to record the selected pvbn and adjusts similar structures of the vvol to record the selected vvbn. A vvid (vvol identifier) of the vvol and the vvbn are inserted into owner map 710 of the aggregate at an entry defined by the selected pvbn. The selected pvbn is also inserted into a container map (not shown) of the destination vvol. Finally, an indirect block or inode file parent of the allocated block is updated with one or more block pointers to the allocated block. The content of the update operation depends on the vvol embodiment. For a dual vbn hybrid vvol embodiment, both the pvbn and vvbn are inserted in the indirect block or inode as block pointers.

E. Network Caching System Operation

The present invention relates to a network caching system 100 having a multi-protocol caching filer 120 coupled to an origin server 180 to provide storage virtualization of data served by the filer in response to data access requests issued by multi-protocol clients 110 over a computer network 140. The multi-protocol caching filer 120 includes file system 280 configured to manage a sparse volume that "virtualizes" a storage space of the data to thereby provide a cache function that enables access to data by the multi-protocol clients. To that end, the caching filer further includes a multi-protocol engine of storage operating system 200 configured to translate the multi-protocol client data access requests into generic file system primitive operations executable by both the caching filer and the origin server 180.

Figure 9:
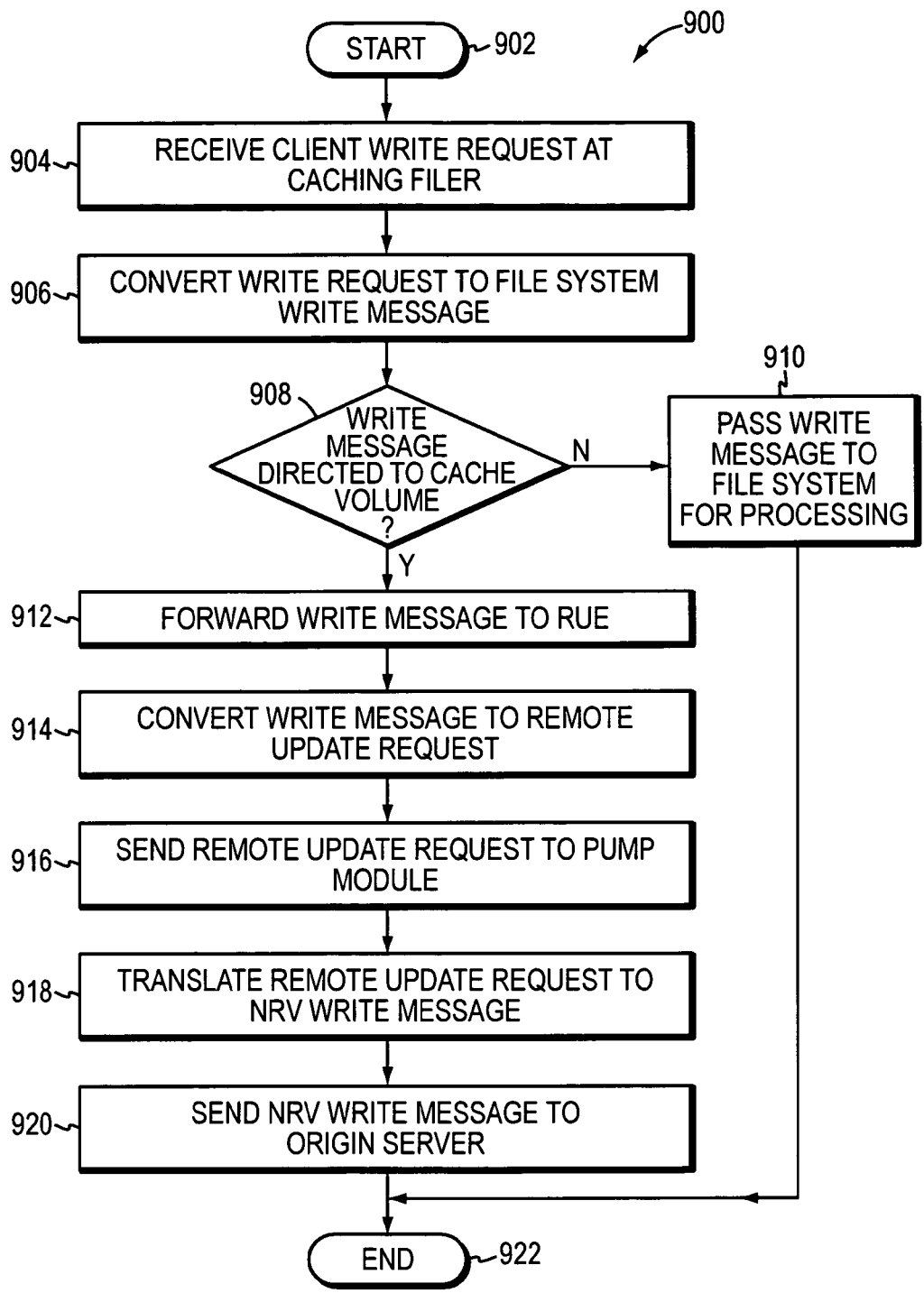
FIG. 9 is a flowchart illustrating the steps of a procedure for processing a data modifying access request in accordance with an embodiment of the present invention.

FIG. 9 is a flowchart illustrating the steps of a procedure 900 for processing a data modifying access request in accordance with an embodiment of the present invention. As used herein, a data modifying access request involves any operation that modifies the cache volume 150 of caching filer 120. Examples of such modifying operations include create (file), set attribute and write operations. The procedure 900 starts at Step 902 and proceeds to Step 904 where a client write request is received at the caching filer 120. In Step 906, the appropriate protocol layer of the multi-protocol engine converts the write request into a generic file system write message for transfer to the file system 280.

In Step 908, the file system determines whether the file system write message is directed to cache volume 150, i.e., a sparse volume configured to support remote update operations. Illustratively, the file system renders this determination by examining the fsinfo block 800 and sparse config file 732. As noted, the fsinfo block 800 has a sparse volume flag 810 that, if asserted, identifies the volume as a sparse volume. In addition, the sparse config file 732 contains identifiers that identify the sparse volume 150 in application type, i.e., whether it supports remote updates for data modifying access requests. If the write message is not directed to the cache volume, the file system passes the file system write message to a conventional write handler of the file system for processing as a primitive write operation request (Step 910) and the procedure ends at Step 922.

However, if the write message is directed to cache volume 150, the file system forwards the write message to the RUE 292 in Step 912. In Step 914, the RUE 292 converts the generic file system write message into a remote update request and, in Step 916, sends the update request to the pump module 298. In the illustrative embodiment, a pump worker thread of the pump module receives the request, which is then prioritized among other requests. In Step 918, the remote update request is translated into an NRV write message and, in Step 920, the NRV write message is sent over the network 140 to the origin server 180 for execution by a file system on the server. The procedure then ends at Step 922.

Figure 10:
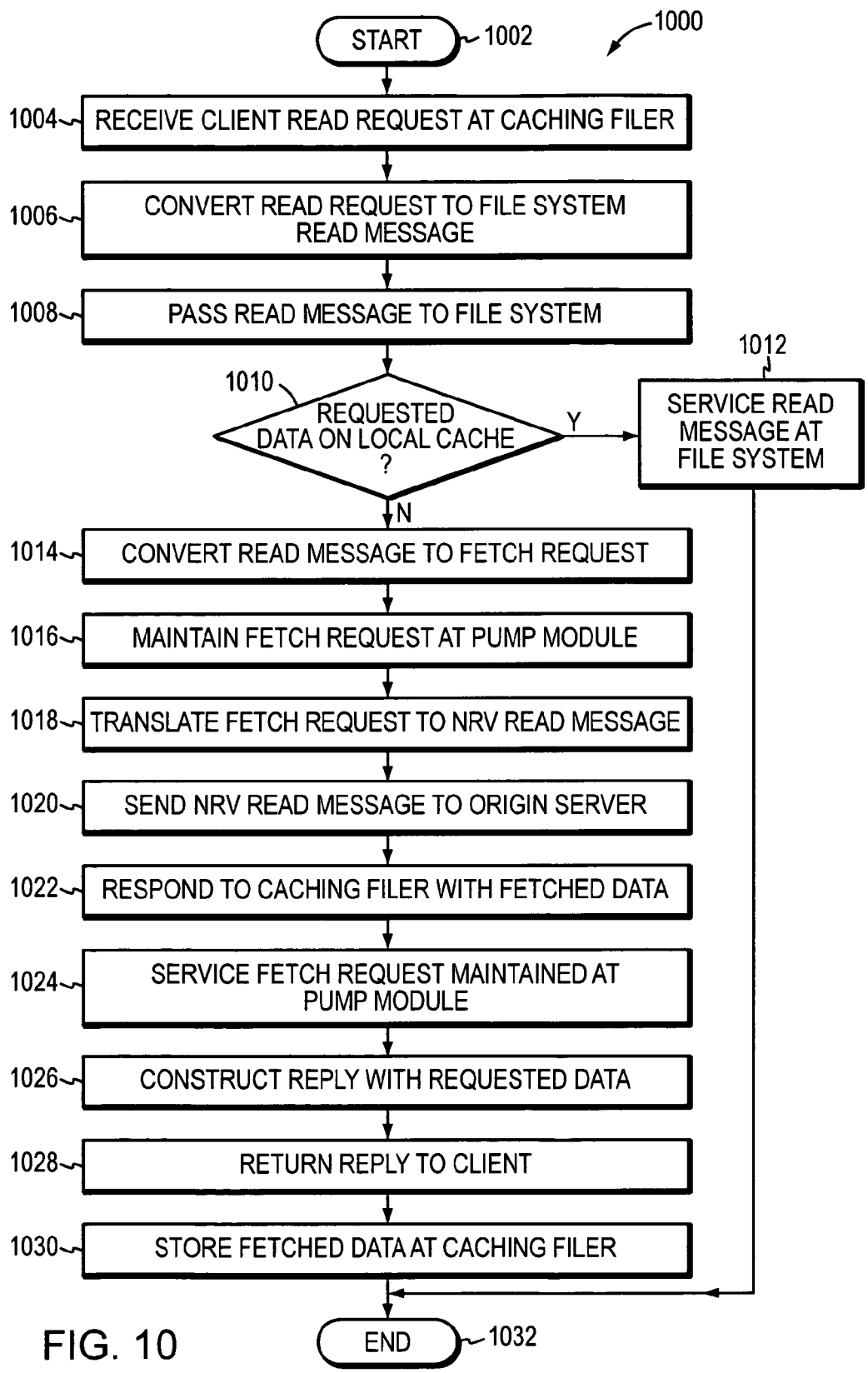
FIG. 10 is a flowchart illustrating the steps of a procedure for processing a non-data modifying access request in accordance with an embodiment of the present invention.

FIG. 10 is a flowchart illustrating the steps of a procedure 1000 for processing a non-data modifying access request in accordance with an embodiment of the present invention. As used herein, a non-data modifying access request involves any operation that does not modify the cache volume 150 of caching filer 120. An example of a non-modifying operation is a read operation. The procedure 1000 starts at Step 1002 and proceeds to Step 1004 where a client read request is received at the caching filer 120. In Step 1006, the appropriate protocol layer of the multi-protocol engine converts the read request into a generic file system read message for transfer to the file system 280 which, in Step 1008, passes the message to a conventional read handler of the file system for processing as a primitive read operation request.

In Step 1010, a determination is made as to whether the requested data is resident on the local cache of the caching filer. Illustratively, the file system renders this determination by loading one or more blocks using, e.g., the Load_Block ( ) 284 function and examining a block pointer of each block to determine whether it is marked ABSENT. If the block is not absent, i.e., the requested data is resident on the local cache, the file system 280 services the read message/request (as previously described) in Step 1012 and the procedure ends at Step 1032.

However, if the block is absent, i.e., the requested data is not resident on the local cache, the file system converts the read message into a fetch request that is sent to the pump module 298 in Step 1014. A pump worker thread of the pump module receives the request, which is then prioritized among other requests. In Step 1016, the pump thread maintains a placeholder for storing the fetch request until a response is received. In Step 1018, the pump thread cooperates with the NRV module 295 to translate the fetch request into an NRV read message and, in Step 1020, the NRV read message is sent over the network 140 to the origin server 180 for execution by the server.

In Step 1022, the origin server responds to the caching filer (pump thread) with the fetched data and, in Step 1024, the pump thread cooperates with a fill handler of the file system to service the pending read/fetch request maintained on the placeholder at the pump module by, e.g., performing a fill operation using the fetched data. In Step 1026, the file system constructs a reply with the requested data and, in Step 1028, returns that reply to the client. In Step 1030, write allocation is subsequently performed at the file system to store the fetched data on one or more local storage devices of the caching filer and the procedure ends at Step 1032.

F. Cache Coherency

In a general network caching system embodiment of the present invention, multiple clients 110 may be coupled to each of a plurality of caching filers 120, and both the clients and filers may be coupled to the origin server 180. It is thus possible that, in this general system embodiment, the origin volume 185 may be modified by clients and/or caching filers 120. As a result, a cache coherency policy is needed to insure that data accessed by clients either directly from the origin server 180 or via a caching filer 120 is always consistent. According to the invention, a cache coherency policy used in the network caching system 100 specifies that the caching filer 120 is configured to check with the origin server 180 to determine if changes occurred to data prior to delivering that data to a client 110.

In response to a client data access request, e.g., a read request, directed to a particular storage object, e.g., a file, the file system 280 of the caching filer 120 sends a fetch on demand (FOD) request to the origin server 180 requesting a latest copy of the file's attributes, e.g., modification time, number of links, creation time, etc. A change in any of the attributes indicates that the file has been modified since it was last cached at the filer. As a result, the caching filer triggers an ejection of the current file stored on its local cache. The caching filer then generates appropriate fetch operations using NRV read messages to retrieve the requested data from the origin server.

Figure 11:
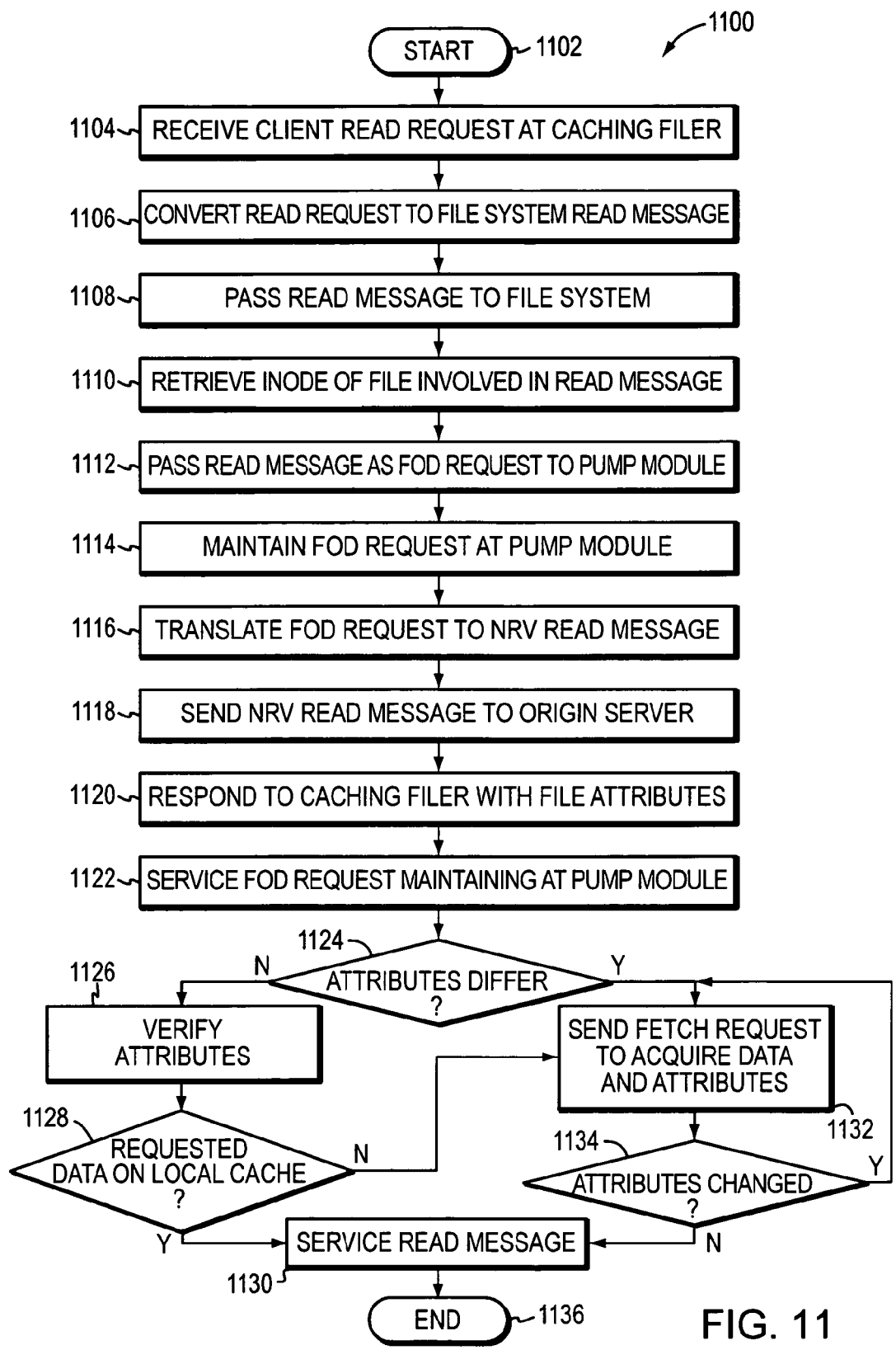
FIG. 11 is a flowchart illustrating the steps of a procedure for implementing a cache coherency policy in accordance with an embodiment of the present invention.

FIG. 11 is a flowchart illustrating the steps of a procedure 1100 for implementing a cache coherency policy in accordance with an embodiment of the present invention. The procedure 1100 starts at Step 1102 and proceeds to Step 1104 where a client data access request, e.g., a read request, is received at the caching filer. In Step 1106, the request is converted into a file system read message for transfer to the file system 280 which, in Step 1108, passes the message to a conventional read handler of the file system for processing as a primitive read operation request. In Step 1110, the read handler retrieves an inode of the file involved in the read request/message using, e.g., the Load_Inode( ) 288 function.

In Step 1112, the file system also passes the read message to the pump module as a FOD request to retrieve attributes of the inode from the origin server. In Step 1114, a pump thread maintains a placeholder for storing the FOD request until a response is received. In Step 1116, the pump thread cooperates with the NRV module to translate the FOD request into an NRV read message and, in Step 1118, the NRV read message is sent over the network 140 to the origin server 180 for execution by the server. In Step 1120, the origin server responds to the caching filer (pump thread) with the attributes and, in Step 1122, the pump thread cooperates with a fill handler of the file system to service the pending read/FOD request maintained on the placeholder at the pump module by, e.g., performing a fill operation using the response.

It should be noted that a fill operation that has no data (i.e., a zero length read or "verify") only carries the attributes; thus, in Step 1124, the fill handler determines if the attributes for the requested file (as received from the origin server) differ from the attributes of that file as currently stored on the caching filer. As for the latter, the state of the attributes for the file stored on the caching filer is determined by examining, e.g., the access and/or modification time stamps 316 stored in the inode 300 for the file. Note that a property of a NRV read message is that any data that is returned in a NRV response also includes the file's latest attributes. A zero length read (verify) is thus equivalent to retrieving the file's latest attributes without fetching any data.

If there is no difference in the attributes (the attributes have not changed), the fill handler triggers a verification that the inode (file) attributes has been verified (Step 1126). Therefore, the NRV exchange between the caching filer 120 and the origin server 180 is essentially a "no op" that has injected extra latency (at least in the simplest cache coherency policy) into the system. In Step 1128, the file system searches the local cache to determine if the client requested data is present on the caching filer. If so, the file system services the read request/message (as previously described) in Step 1130 and the procedure ends at Step 1136.

However, if the requested data (or a portion thereof) is not resident on the local cache (i.e., data is missing), the file system converts the read message into a fetch request that is eventually sent to the origin server to acquire the missing data (as previously described) in Step 1132. Note that the response from the origin server includes both the missing data and the latest attributes of the file. Note also that if there is a difference in attributes (as determined at Step 1124) the procedure continues to Step 1132. In Step 1134, a determination is made as to whether those attributes have changed (i.e., they have changed between the time there were initially verified on the caching filer and the time at which the missing data is retrieved). If so, the procedure returns to Step 1132. Otherwise, the procedure continues to Step 1130.

Notably, the data requested by a client is verified prior to determining whether it is present on the caching filer 120. This is because, if the data is present on the caching filer, there is no issue even if an update to that data occurred on the origin server 180 between verification and serving of the data to the client. In this latter case, those operations are considered "overlapping operations" and are serialized by treating the read request as occurring first. Note further that the attributes may change considering the network caching system deployment with multiple clients accessing multiple caching filers and/or the origin server.

In the illustrative embodiment, there is no explicit locking on a network caching system deployment. However, the network caching system relies on a semantic that a read operation overlapping with a write operation (i.e., the write does not occur before a verify) could return the read prior to the write. In other words, the verify response indicates that no attributes have changed for the file and that file data can be served from the cache volume 150 of the caching filer (if possible). When subsequently serving that data from the cache volume, the caching filer 120 operates as though the read operation occurred before the write operation.

Clearly in a cache hit case, the network caching system 100 preserves that semantic. In a partial cache miss case, the network caching system preserves that semantic by effectively starting from scratch. As for the latter, assume a client issues a 32 kB read request and the caching filer is missing just a 4 kB block of that request (that missing data is not on the cache volume). A normal response to this situation is for the caching filer to send a 4 kB NRV read message to fill in the missing data, along with an implicit verify (because every read returns file attributes). Assume further that a previous explicit verify indicates that nothing has changed to the data, but that an intervening write operation occurs between the explicit verify and sending of the 4 kB NRV read message. The caching filer detects that intervening write because the attributes have changed in the read response (as indicated by the implicit verify accompanying the response). This, in turn, causes the caching filer 120 to eject its copy of the file on its cache volume 150 and generate appropriate fetch operations using NRV read messages to retrieve the requested data from the origin server 180. This situation presents a case where write operations may cause excessive and wasteful read operations.

In accordance with an aspect of the invention, the pump module 298 can be used to alleviate such starvation. The pump module implements flow control and the novel network caching system architecture provides another form of flow control that essentially proxies read operations to the origin server 180 instead of servicing them via the normal file system read handler. That is, in response to difficulty loading data for a file into its local cache in order to serve client requests, the caching filer 120 switches to a mode where read operations directed to that file are passed to the RUE 292 (similar to a write operation) and onto the origin server 180, rather than through the file system 280 to the read handler. The origin server then uses standard flow control and atomicity mechanisms in order to return a single response to that read operation.

G. Prioritization

According to an aspect of the present invention, readahead operations are performed by the caching filer and, thus, the filer implements prioritization as there is a distinction between client requests and speculative readahead requests. An advantage of this feature to the network caching system implementation is that because it does not "see" all client requests, the origin server does not have as much knowledge as the caching filer normally would when making readahead decisions. Because it has a multi-protocol engine executing thereon, the caching filer can make the same readahead decisions that would ordinarily be made by the origin server, even though there is a cache volume between the filer and server. In particular, the caching filer uses the same readahead engine as would be used by the origin server and, thus, generates the same readahead request as would the origin server. As for prioritization of the requests, the network caching system implementation treats the requests as two different priority bands, wherein a client request prioritizes over speculative readahead and if the system is saturated, speculative readahead requests are dropped.

H. Cache Ejection

As noted, the truncator 294 encodes a cache ejection policy to reclaim storage space as the local cache (e.g., cache volume 150) becomes full. In the situation where the cache volume 150 of the caching filer 120 is smaller than a working set stored on the origin volume 185 of the origin server 180, cache ejection decisions frequently arise. As client requests are received, the caching filer needs to free up volume storage space to cache (store) those requests. In freeing up space, some data must be evicted from the cache volume 150. In the illustrative embodiment, the truncator 294 is embodied as a scanner configured to, as space is needed, (i) "walk" the cache volume 150 to scan buffer trees of files stored on the volume and (ii) make decisions as to which previously cached data should be evicted.

Illustratively, the cache ejection policy is a round-robin procession through the inode file, with the advantage that there is no need to maintain a global least recently used (LRU) list. To that end, the truncator 294 scans the inode file in a round-robin manner, e.g., starting at the beginning of the inode file, progressing to the end and then restarting at the beginning of that file, and arbitrarily evicts every entire file that it comes across (until the required free space is met). Thus, the policy randomly evicts files when space is required, but has the property that the same file is not evicted twice until the inode file has been entirely traversed. If the cache volume is busy, it is highly likely that the vast majority of the working set will be cached at any given time. However, if a "popular" file is mistakenly evicted, the policy won't evict that file again until the truncator traverses the entire inode file.

Figure 12:
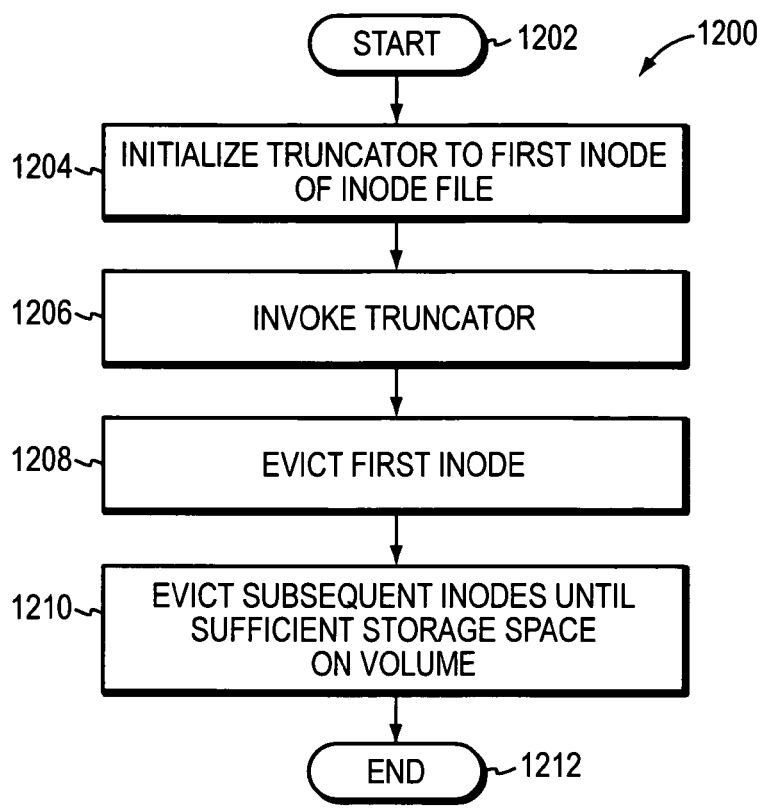
FIG. 12 is a flowchart illustrating the steps of a procedure for implementing a cache ejection policy in accordance with an embodiment of the present invention.

FIG. 12 is a flowchart illustrating the steps of a procedure 1200 for implementing a cache ejection policy in accordance with an embodiment of the present invention. The procedure starts at Step 1202 and proceeds to Step 1204 where the truncator is initialized to a first inode of the inode file. In Step 1206, the truncator is awoken (invoked) in response to, e.g., the cache volume getting fully populated. In Step 1208, the truncator "evicts" the first inode and, in Step 1210, proceeds to evict subsequent inodes (files) until there is sufficient available storage space on the volume. In essence, the truncator is activated and sweeps across the inode file only when storage space on the cache volume needs to reclaimed. An inode or file (or, more specifically, the inode buffer tree of a file) is illustratively evicted by passing the buffer tree to a "zombie" system that deletes the existing blocks and that inode is then replaced with an inode that has a "hole" at a top level. In this context, a hole is defined as an unallocated section of the inode file on the cache volume (as opposed to an absent block, which is allocated). The procedure then ends at Step 1212.

An optimization to the cache ejection policy evicts (deletes) entire blocks of inodes, e.g., deletes every inode in an inode file block, frees the inode file block and inserts a hole at its location in the inode file (allocates a new empty inode file block). A hole (or unallocated section of the inode file) on the cache volume is in accord with an inode file block on the origin server that might actually have inodes allocated. In this latter case, the caching filer only allocates an inode file block when a client requests access to a particular file; upon allocating the inode file block, the caching filer initiates a fetch to acquire the file contents. This cache-specific format enables use of a file system default policy for filling holes in the inode file with fresh unallocated inodes.

In the illustrative embodiment, there are two triggers for activating the truncator 294. One trigger occurs at fill time (wherein the term "fill" denotes actions that take place when a response is received at the caching filer from the origin). At fill time, it is desirable to insert any returned data into the buffer tree of its file; but if there is insufficient physical disk space to accommodate that data, the truncator is triggered by space accounting in the file system. Illustratively, the number of free blocks in the aggregate is examined and, based on a low-high water mark (e.g., 85-95%), a determination is made that it is appropriate to trigger the truncator.

Another trigger of the truncator is at a file system consistency point (CP) time. Because cache volumes are flexible vvols, they might co-exist on the same aggregate with traditional volumes. As a traditional (or virtual) volume expands to consume more disk space, truncation is triggered on the cache volume to restrict its consumption of disk space. The amount of disk space (free physical space in the aggregate) is tested at CP time (e.g., every 10 seconds or however frequently a CP occurs). Here, the write allocator 282 signals the truncator 294 to re-start and free up aggregate storage space until the available space falls below the established low water mark.

I. Conclusion

Advantageously, the present invention virtualizes the storage space of the multi-protocol caching filer to enable fast and efficient client access to data served by the network caching system. Unlike previous caching systems that require explicit file handle-to-object store conversion, the novel multi-protocol caching filer enables efficient client access to data served by the network caching system through use of the file system and, in particular, the use of actual names of the storage objects (files) organized by the file system. Moreover, the file system cooperates with the sparse volume of the caching filer to provide storage space virtualization of the served data in a manner that is transparent to the multi-protocol clients.

While there has been shown and described illustrative embodiments of a network caching system having a multi-protocol caching filer coupled to an origin server to provide storage virtualization of data served by the filer in response to data access requests issued by multi-protocol clients over a computer network, it is to be understood that various other adaptations and modifications may be made within the spirit and scope of the invention. For example, in an alternate embodiment of the invention, the demand generator 296 may be used to systematically retrieve data blocks that are not stored locally on disk for purposes of pre-populating the cache volume. Note that it is common in a caching deployment to have a cache volume 150 that is much smaller than the origin volume 185 (e.g., to provide an advantage over pure replication). As a result, pre-population of the smaller cache volume requires a specialized demand generator configured to render intelligent decisions about the data that should be resident in the local cache, since not all of the origin data can fit in the cache.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A caching system, comprising:
    a plurality of network interfaces configured to communicate data over a computer network, wherein a first network interface is connected to a client and a second network interface is connected to an origin computer;
    a processor coupled to the plurality of network interfaces and configured to execute one or more processes; and
    a memory configured to store a process executable by the processor, the process when executed operable to:
    receive a data access request from the client for the data;
    send a request to the origin computer for attributes associated with the data;
    service the data access request at the caching system in response to determining that the requested attributes from the origin computer do not differ from local attributes associated with the data stored at the caching system; and
    retrieve the data and the requested attributes from the origin computer and verify that the requested attributes have not changed since the data was retrieved from the origin computer, in response to determining that the requested attributes differ from the local attributes.

2. The caching system of claim 1, wherein the process when executed is further operable to:
    determine that the requested attributes have changed since the data was retrieved from the origin computer; and
    retrieve updated data and updated attributes from the origin computer in response to determining that the requested attributes have changed since the data was retrieved from the origin computer.

3. The caching system of claim 1, wherein the process when executed is further operable to:
    utilize a sparse volume of the caching system, wherein the sparse volume includes at least one absent block representing missing data that is missing from the sparse volume, wherein the missing data of the absent block is stored on the origin computer and retrieved in a manner that is transparent to the client.

4. The caching system of claim 1, wherein the process when executed is further operable to:
    examine at least one of an access time and a modification time of an inode associated with the local attributes to determine whether the requested attributes differ from local attributes.

5. The caching system of claim 3, wherein the process when executed is further operable to:
    utilize a remote update engine (RUE) to forward any file system operations that modify the sparse volume to the origin computer of the caching system.

6. The caching system of claim 3, wherein the process when executed is further operable to:
    utilize a truncator to implement a cache ejection policy to reclaim storage space if the sparse volume becomes full.

7. The caching system of claim 1, wherein the process when executed is further operable to:
    determine whether the data is located at the caching system;
    send the data to the client in response to determining that the data is located at the caching system; and
    acquire the data from the origin computer and send the data to the client in response to determining that the data is not located at the caching system.

8. The caching system of claim 1, wherein the requested attributes include at least one of a modification time, a number of links, and a creation time.

9. The caching system of claim 1, wherein determining that the requested attributes differ from local attributes indicates that the data has been modified since it was last cached at the caching system.

10. A method comprising:
    receiving, at a caching computer, a data access request from a client for data, wherein the caching computer is coupled to the client and an origin computer over a computer network;
    sending a request for attributes associated with the data from the caching computer to the origin computer;

in response to determining, by a processor of the caching computer, that the requested attributes from the origin computer do not differ from local attributes associated with the data stored at the caching computer, servicing the data access request at the caching computer; and in response to determining, by the processor of the caching computer, that the requested attributes from the origin computer differ from the local attributes:
retrieving the data and the requested attributes from the origin computer,
and
verifying that the requested attributes have not changed since the data was retrieved from the origin computer.

11. The method of claim 10, further comprising:
retrieving updated data and updated attributes in response to determining that the requested attributes have changed since the data was retrieved from the origin computer.

12. The method of claim 10, further comprising:
utilizing a sparse volume at the caching computer, wherein the sparse volume includes at least one absent block representing missing data that is missing from the sparse volume, wherein the missing data of the absent block is stored on the origin computer and retrieved in a manner that is transparent to the client.

13. The method of claim 10, further comprising:
examining at least one of an access time and a modification time of an inode associated with the local attributes to determine whether the requested attributes differ from local attributes.

14. The method of claim 12, further comprising:
utilize a remote update engine (RUE) to forward any file system operations that modify the sparse volume to the origin computer of the caching computer.

15. The method of claim 12, further comprising:
utilize a truncator to implement a cache ejection policy to reclaim storage space if the sparse volume becomes full.

16. The method of claim 10, further comprising:
determining whether the data is located at the caching computer;
sending the data to the client in response to determining that the data is located at the caching computer; and
acquiring the data from the origin computer and sending the data to the client in response to determining that the data is not located at the caching computer.

17. The method of claim 10, wherein the requested attributes include at least one of a modification time, a number of links, and a creation time.

18. The method of claim 10, wherein determining that the requested attributes differ from local attributes indicates that the data has been modified since it was last cached at the caching computer.

19. A non-transitory computer-readable storage medium containing executable program instructions executed by a processor, comprising:
program instructions that receive a data access request from a client for data, wherein the request is received at a caching computer that is coupled to the client and an origin computer over a computer network;
program instructions that send a request for attributes associated with the data from the caching computer to the origin computer;
program instructions that service the data access request at the caching computer in response to determining that the requested attributes from the origin computer do not differ from local attributes associated with the data stored at the caching computer; and
program instructions that retrieve the data and the requested attributes from the origin computer and verify that the requested attributes have not changed since the data was retrieved from the origin computer, in response to determining that the requested attributes differ from the local attributes.

* * * * *